(12) United States Patent
England et al.

(10) Patent No.: US 6,304,014 B1
(45) Date of Patent: Oct. 16, 2001

(54) MOTOR CONTROL SYSTEM

(75) Inventors: James M. C. England, Harston; Andrew N. Dames, Cambridge; David T. E. Ely, Harston; Malcolm Burwell, Harston; Geoffrey Foote, Harston, all of (GB)

(73) Assignee: Synaptics (UK) Limited, Harston (GB)

( * ) Notice: Subject to any disclaimer, the term of this patent is extended or adjusted under 35 U.S.C. 154(b) by 0 days.

(21) Appl. No.: 09/509,651

(22) PCT Filed: Oct. 2, 1998

(86) PCT No.: PCT/GB98/02961

§ 371 Date: Jun. 8, 2000

§ 102(e) Date: Jun. 8, 2000

(87) PCT Pub. No.: WO99/18653

PCT Pub. Date: Apr. 15, 1999

(30) Foreign Application Priority Data

Oct. 2, 1997 (GB) .................................... 9720954

(51) Int. Cl.[7] ................................ H02P 6/16; G01D 5/20

(52) U.S. Cl. ................................ 310/68 B; 324/207.16; 324/207.13; 318/254

(58) Field of Search .................. 310/68 B, 67 R; 324/207.25, 207.16, 207.17, 207.13; 318/254

(56) References Cited

U.S. PATENT DOCUMENTS

| | | | |
|---|---|---|---|
| 2,145,742 | 1/1939 | Wechsung | 178/44 |
| 2,867,783 | * 1/1959 | Childs | 310/68 B |
| 2,942,212 | 6/1960 | Mynall | 336/30 |
| 3,219,956 | 11/1965 | Newell et al. | 336/79 |
| 3,297,940 | 1/1967 | Mulligan et al. | 323/51 |
| 3,482,242 | 12/1969 | Hargrove | 340/347 |

(List continued on next page.)

FOREIGN PATENT DOCUMENTS

| | | |
|---|---|---|
| 1134848 | 8/1962 | (DE) . |
| 3500121 A1 | 7/1986 | (DE) . |
| 3620412 A1 | 12/1987 | (DE) . |
| 0159191 A2 | 10/1985 | (EP) . |
| 0182085 A2 | 5/1986 | (EP) . |

(List continued on next page.)

OTHER PUBLICATIONS

Pulle et al, "A New Magnetoresistive Based Sensor for Switched Reluctance Drives" *Proceedings of the Annual Power Electronics Specialists Conference* (PESC), Toledo, Jun. 29–Jul. 3, 1992, vol. 2, No. Conf. 23, Jun. 29, 1992, pp. 839–843, Institute of Electrical and Electronics Engineers.

Ely et al, Ser. No. 09/111,885, filed Jul. 8, 1998, Position Detector; (division of Ser. No. 09/627,423 filed Jul. 27 , 2000);.

Patent Abstracts Japan, vol. 010, No. 009, (P–420), Jan. 14, 1986 & JP 60 165512A (Toshiba KK), Aug. 28, 1985.

Klatt, "Phase of Digital Data Fixes Shaft Angle", Electrical Design News, vol. 16, No. 12, Jun. 15, 1971, pp. 53–56, XP002045871.

(List continued on next page.)

*Primary Examiner*—Burton S. Mullins
(74) *Attorney, Agent, or Firm*—Nixon & Vanderhye P.C.

(57) ABSTRACT

An electric motor is described in which a position sensor is provided which generates a plurality of output signals each dependent upon the relative position of the rotor and the stator. These signals are processed to generate a set of commutation control signals for controlling the commutation of the drive current to the stator coils. In one embodiment, a phase shift can be electronically applied to each of the position sensor coils to adjust the timing of the switching in accordance with the motor's current speed and load demands. In another embodiment, these signals are also used in a servo-control loop, in order to control, for example, the speed and/or output torque of the motor.

47 Claims, 18 Drawing Sheets

U.S. PATENT DOCUMENTS

| | | | |
|---|---|---|---|
| 3,647,963 | 3/1972 | Bailey | 178/19 |
| 3,772,587 | 11/1973 | Ferrand et al. | 336/16 |
| 3,812,481 | 5/1974 | Stednitz | 340/196 |
| 3,851,242 | 11/1974 | Ellis | 324/40 |
| 3,895,356 | 7/1975 | Kraus | 340/172.5 |
| 3,898,635 | 8/1975 | Kulterman | 340/196 |
| 3,906,436 | 9/1975 | Kurauchi et al. | 340/38 L |
| 3,962,663 | 6/1976 | Visser | 340/196 |
| 4,005,396 | 1/1977 | Fujiwara et al. | 178/19 |
| 4,014,015 | 3/1977 | Gundlach | 178/19 |
| 4,065,850 | 1/1978 | Burr et al. | 29/625 |
| 4,081,603 | 3/1978 | Davis et al. | 73/117.3 |
| 4,092,852 | 6/1978 | Fowler et al. | 324/208 |
| 4,094,572 | 6/1978 | Burr etl al. | 174/68.5 |
| 4,097,684 | 6/1978 | Burr | 174/68.5 |
| 4,150,352 | 4/1979 | Pomella et al. | 336/129 |
| 4,156,192 | 5/1979 | Schedrovitsky et al. | 178/19 |
| 4,210,775 | 7/1980 | Rodgers et al. | 178/19 |
| 4,223,300 * | 9/1980 | Wiklund | 310/68 B |
| 4,255,617 | 3/1981 | Carau, Sr. et al. | 178/19 |
| 4,341,385 | 7/1982 | Doyle et al. | 273/237 |
| 4,423,286 | 12/1983 | Bergeron | 178/19 |
| 4,425,511 * | 1/1984 | Borsh | 310/68 B |
| 4,482,784 | 11/1984 | Whetstone | 178/19 |
| 4,504,832 | 3/1985 | Conte | 340/870.37 |
| 4,507,638 | 3/1985 | Brosh | 336/79 |
| 4,532,376 | 7/1985 | Rockwell | 178/18 |
| 4,577,057 | 3/1986 | Blesser | 178/18 |
| 4,593,245 | 6/1986 | Vierti et al. | 324/238 |
| 4,609,776 | 9/1986 | Murakami et al. | 178/18 |
| 4,642,321 | 2/1987 | Schoenberg et al. | 523/400 |
| 4,693,778 | 9/1987 | Swiggett et al. | 156/361 |
| 4,697,144 | 9/1987 | Howbrook | 324/207 |
| 4,697,244 | 9/1987 | Murakami et al. | 364/520 |
| 4,704,501 | 11/1987 | Taguchi et al. | 178/19 |
| 4,709,209 | 11/1987 | Murakami et al. | 324/207 |
| 4,711,026 | 12/1987 | Swiggett et al. | 29/850 |
| 4,711,977 | 12/1987 | Miyamori et al. | 178/18 |
| 4,723,446 | 2/1988 | Saito et al. | 73/313 |
| 4,734,546 | 3/1988 | Landmeier | 178/19 |
| 4,737,698 | 4/1988 | McMullin et al. | 318/653 |
| 4,786,765 | 11/1988 | Yamanami et al. | 178/19 |
| 4,820,961 | 4/1989 | McMullin | 340/347 P |
| 4,848,496 | 7/1989 | Murakami et al. | 178/19 |
| 4,868,443 * | 9/1989 | Rossi | 310/268 |
| 4,878,553 | 11/1989 | Yamanami et al. | 178/18 |
| 4,891,590 | 1/1990 | Hammel et al. | 324/207 |
| 4,893,077 | 1/1990 | Auchterlonie | 324/208 |
| 4,902,858 | 2/1990 | Yamanami et al. | 178/18 |
| 4,963,703 | 10/1990 | Phillips | 341/5 |
| 4,975,546 | 12/1990 | Craig | 340/870.34 |
| 4,985,691 | 1/1991 | Pulyer et al. | 336/130 |
| 4,999,461 | 3/1991 | Murakami et al. | 178/19 |
| 5,013,047 | 5/1991 | Schwab | 273/238 |
| 5,028,745 | 7/1991 | Yamanami et al. | 178/19 |
| 5,041,785 | 8/1991 | Bogaerts et al. | 324/204.24 |
| 5,082,286 | 1/1992 | Ryan et al. | 273/238 |
| 5,088,928 | 2/1992 | Chan | 434/339 |
| 5,129,654 | 7/1992 | Bogner | 273/238 |
| 5,136,125 | 8/1992 | Russell | 178/19 |
| 5,177,389 * | 1/1993 | Schalk | 310/171 |
| 5,188,368 | 2/1993 | Ryan | 273/237 |
| 5,381,091 | 1/1995 | Kobayashi et al. | 324/207.17 |
| 5,406,155 * | 4/1995 | Persson | 310/68 B |
| 5,434,372 | 7/1995 | Lin | 178/19 |
| 5,486,731 * | 1/1996 | Masaki et al. | 310/180 |
| 5,619,431 | 4/1997 | Oda | 364/559 |
| 5,625,239 * | 4/1997 | Persson et al. | 310/68 B |
| 5,693,993 * | 12/1997 | Ito et al. | 310/68 B |
| 5,748,110 | 5/1998 | Sekizawa | 178/19 |
| 5,783,940 * | 7/1998 | Kolomeitsev | 310/68 B |
| 5,815,091 | 10/1990 | Dames | 340/870.37 |
| 6,124,708 | 9/2000 | Dames | 318/597 |

FOREIGN PATENT DOCUMENTS

| | | |
|---|---|---|
| 0182085 A3 | 5/1986 | (EP) . |
| 0209513 A1 | 6/1986 | (EP) . |
| 0218745 | 4/1987 | (EP) . |
| 0 313 046 | 4/1989 | (EP) . |
| 0537458 | 4/1993 | (EP) . |
| 0552001 A1 | 7/1993 | (EP) . |
| 0 554 900 | 8/1993 | (EP) . |
| 06077694 A1 | 7/1994 | (EP) . |
| 0657917 A1 | 6/1995 | (EP) . |
| 0675581 A1 | 10/1995 | (EP) . |
| 0680009 A2 | 11/1995 | (EP) . |
| 0 709 648 | 5/1996 | (EP) . |
| 0716390 | 6/1996 | (EP) . |
| 0743508 A2 | 11/1996 | (EP) . |
| 0772149 | 5/1997 | (EP) . |
| 1325017 | 3/1962 | (FR) . |
| 2298082 | 8/1976 | (FR) . |
| 2682760 | 4/1993 | (FR) . |
| 85143 | 10/1960 | (GB) . |
| 1122763 | 8/1968 | (GB) . |
| 1452132 | 10/1976 | (GB) . |
| 2012431 | 7/1979 | (GB) . |
| 2021273 | 11/1979 | (GB) . |
| 2042183 | 9/1980 | (GB) . |
| 2059593 | 4/1981 | (GB) . |
| 2064125 | 6/1981 | (GB) . |
| 2074736 | 11/1981 | (GB) . |
| 1604824 | 12/1981 | (GB) . |
| 2103943 | 3/1983 | (GB) . |
| 2141235 | 12/1984 | (GB) . |
| WO 92/12401 | 7/1992 | (WO) . |
| WO 94/25829 | 11/1994 | (WO) . |
| 95/31696 | 11/1995 | (WO) . |
| WO 96/03188 A1 | 2/1996 | (WO) . |
| WO 97/14935 | 4/1997 | (WO) . |
| WO 98 00921 A | 1/1998 | (WO) . |
| WO 98/00921 | 1/1998 | (WO) . |

OTHER PUBLICATIONS

Patent Abstracts of Japan, vol. 15, No. 37 (P–1159), Jan. 29, 1991 & JP 02 275314 A (OMRON Tateisi Electron CO), Nov. 9, 1990.

Patent Abstracts of Japan, vol. 10, No. 32 (E–379), Feb. 7, 1986 & JP 60 189231 A (Matsushita Denki Sangyo KK, Sep. 26, 1985.

McDonnell, "The Use of Inductosyn to Digital Converters in Linear Control Systems", Automation, vol. 10, No. 11–12, Nov. 1975–Dec. 1975, pp. 31–32.

Electronics Letters, vol. 11, No. 1,9 Jan. 1975, pp. 5–6, Gordon, Digital xy Position Indicator Using Walsh Functions.

* cited by examiner

FIG. 3a
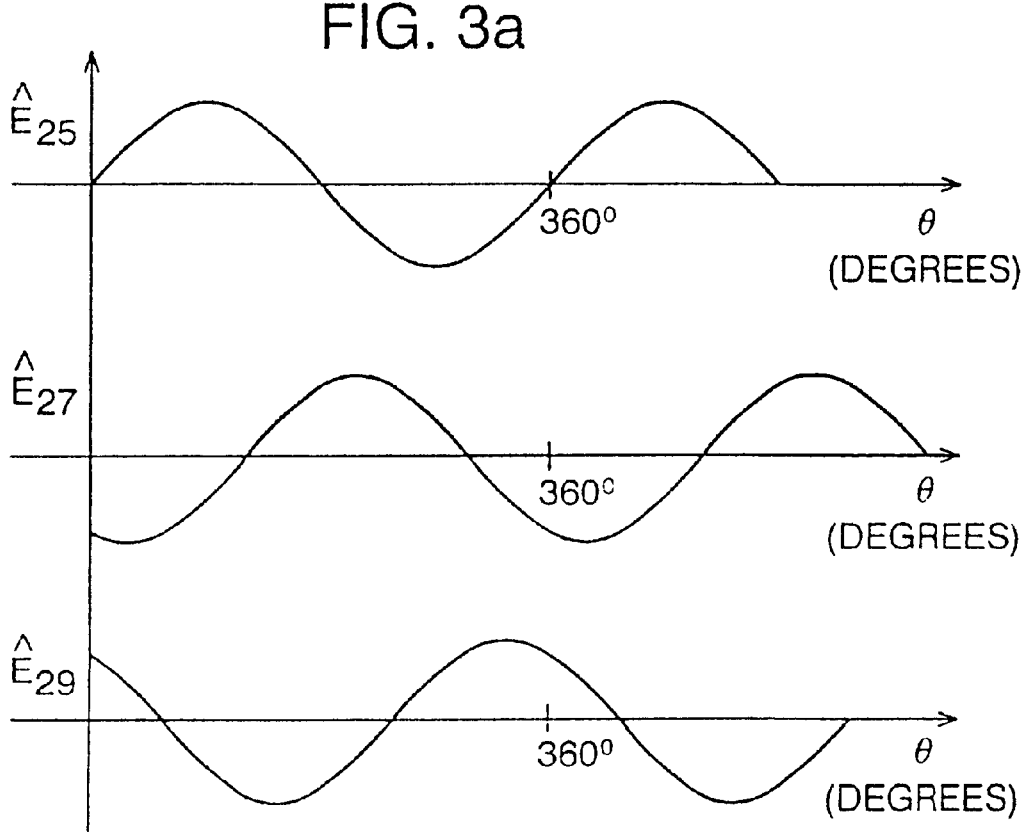
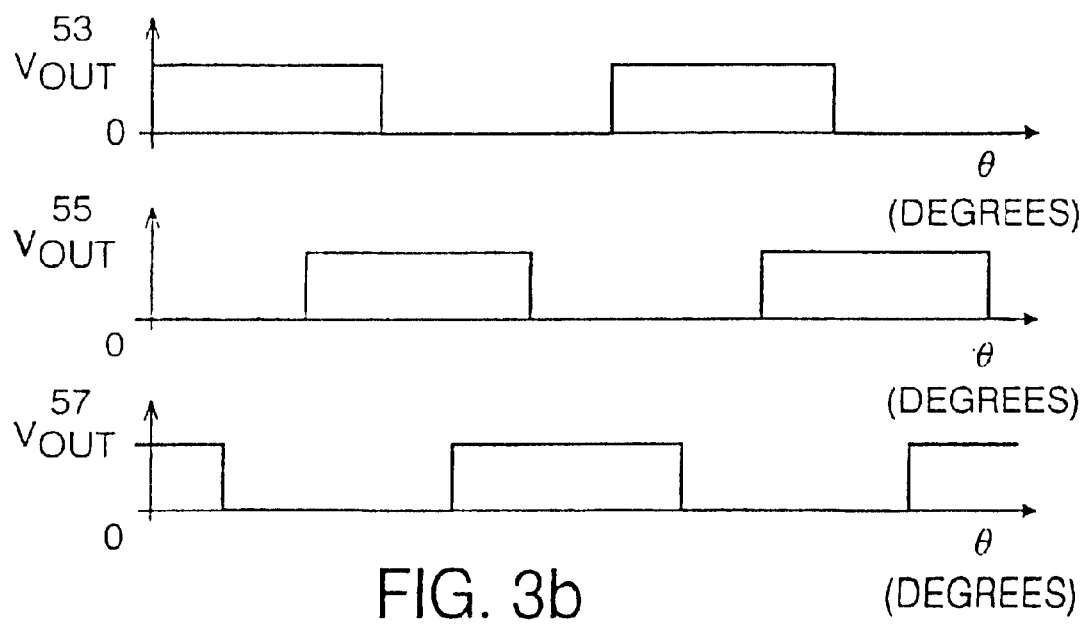
FIG. 3b

MOTOR CONTROL SYSTEM

The present invention relates to an apparatus for and a method of controlling electric motors. The invention has particular, although not exclusive, relevance to the electronic commutation of brushless motors.

Existing servo-controlled motors sense the motor's current position, speed and/or torque and use this in a feedback control loop to control the current applied to the stator and/or rotor coils in order to obtain/maintain a desired position/speed and/or output torque. Brushless motors also need to monitor the relative position of the rotor and stator in order to control the commutation of the drive current into the stator and/or rotor coils. To date, a separate position sensor has been used to perform these two control functions. In particular, most systems employ a plurality of Hall effect sensors spaced apart around the stator (typically three spaced apart by 60°) for controlling the commutation and use either an optical encoder or a resolver for providing position/velocity/acceleration feedback for controlling position, speed and/or output torque of the motor by controlling the amount of drive current applied to the stator and/or rotor coils.

The Hall effect sensors, whilst being relatively inexpensive and reliable, suffer from a number of problems. These include that the output signals can be noisy because they are susceptible to electromagnetic interference and their output characteristics change with temperature. Furthermore, since a plurality of individual Hall effect sensors are used, they must be accurately aligned relative to the stator in order to obtain the correct phase relationship between the commutation signals. In any event, errors in the commutation signals will be inevitable because each of the Hall effect sensors will have a slightly different characteristic to the others.

With regard to the resolvers, they suffer from the problem of a poor response time to changes in, for example, the desired motor speed or motor load. This is because they sense position using iron-cored pick-up coils which have an "inertia" due to magnetic inertia of the iron core. This inertia increases their response time to changes in motor speed. Additionally, the coil which is mounted with the rotor is relatively heavy and must be securely attached and balanced on the rotor so that it does not cause mechanical imbalance at high speeds.

With regard to optical sensors, both incremental and absolute optical sensors are available. An absolute optical sensor could be used to control both the commutation and the drive to the motor. However, absolute optical position sensors are expensive and therefore servo motors which employ optical sensors usually employ an incremental optical sensor for providing position/velocity/acceleration feedback to a controller which controls position/speed and/or output torque of the motor; and separate Hall effect sensors for controlling the commutation. A further problem with the optical system is that they need to be isolated from the environment so that they do not become contaminated with dirt.

One aim of the present invention is to provide a brushless motor which employs an alternative type of position sensor.

According to one aspect, the present invention provides an electric motor comprising: a stator and an element movable relative to said stator; a plurality of energising coils; means for switching a supply current to one or more of said energising coils; a position sensor for sensing the position of said movable element, the position sensor comprising a plurality of circuits each having at least two loops connected in series and wound in opposite sense; and a field generator for generating a field, which generator, is adapted, in use, to be electromagnetically coupled to each of said circuits such that, in response to an electromagnetic field generated by said field generator, a plurality of output signals are generated respectively dependent upon the electromagnetic coupling between the field generator and the respective said circuits; and means for processing said plurality of output signals to generate a plurality of control signals for controlling said switching means.

In one embodiment, the output signals vary periodically with said relative position and out of phase with respect to each other. Preferably, means are provided for varying the phase of said signals so that the position of the first and second circuits and of said field generator relative to said rotor do not have to be accurately aligned during manufacture.

In another embodiment, the output signals from the position sensor are used in a feedback control loop to control the position, speed and/or output torque of the motor.

According to another aspect, the present invention provides a position sensor comprising first and second members which are adapted, in use, to be movable relative to each other; said first member comprising a first circuit having at least two loops connected in opposite sense and a second circuit; said second member comprising a field generator having a first portion which is adapted, in use, to have a substantially constant electromagnetic coupling with said second circuit and a second portion having at least two loops connected in series and being arranged so that signals generated in said at least two loops by a common electromagnetic field oppose each other; wherein the loops of the second portion are adapted in use to be electromagnetically coupled to said loops of the first circuit, which coupling varies as a function of the relative position of said first and second members, such that in response to an input driving signal applied to one of said first and second circuits, said field generator generates an electromagnetic field which in turn generates an output signal in the other one of said first and second circuits, which output signal varies as a function of the relative position of said first and second members.

A further aspect of the present invention provides a similar system to the first aspect except instead of using the output from the position sensor to control the commutation of the drive current to the energising coils, the output signals from the position sensor are used by a controller to control, for example, the motor position, speed and/or output torque.

According to another aspect, the present invention provides an electric motor comprising: a stator and an element movable relative to the stator; a plurality of energising coils; means for switching a supply current to one or more of the energising coils; means for sensing the position of said movable element relative to said stator and for generating a plurality of output signals which periodically vary with said relative position and out of phase with respect to each other; and phase shift means for shifting the phase of said plurality of periodically varying output signals to generate a plurality of control signals for controlling said switching means.

The present invention also provides a circuit for use in a position sensor comprising at least two series connected alternate sense loops of conductor and wherein the loops are arranged to cross each other to define a plurality of sub-loops, adjacent ones of which have opposite sense.

According to another aspect, the present invention provides a circuit for use in a position sensor comprising a first portion having at least one loop and a second portion connected in series with the first portion, the second portion comprising a number of loops connected in series and being arranged so that signals generated in adjacent loops by a common magnetic field oppose each other.

Preferably in this circuit, the first portion comprises a plurality of concentric loops connected in series so that signals generated in at least two of the loops by a common electromagnetic field oppose each other. In this way, both the first and second portions can be made relatively immune to electromagnetic interference.

According to a further aspect, the present invention provides a circuit for use in a position sensor comprising a plurality of series connected concentric loops arranged so that the winding direction of the outer most loop is opposite to the winding direction of other ones of said concentric loops.

The present invention also provides a method of controlling a motor using the position sensor described above.

Exemplary embodiments of the present invention will now be described with reference to the accompanying drawings in which:

FIG. 1a schematically illustrates a motor having a position encoder mounted relative thereto, for encoding the position of the rotor of the motor;

FIG. 1b schematically shows the stator coils and the rotor of the motor shown in FIG. 1a;

FIG. 3a illustrates the way in which the peak amplitude of the signal induced in each receive winding forming part of the position encoder shown in FIG. 1 varies with the angular position of the rotor of the motor shown in FIG. 1;

FIG. 3b illustrates the way in which the switching control signals, used to control the switching of the drive current to the stator coils, vary with the angular position of the rotor;

FIG. 4d shows a top layer of printed conductors forming part of the printed circuit board shown in FIG. 4a;

FIG. 4e shows the bottom layer of printed conductors forming part of the printed circuit board shown in FIG. 4a;

Figure 11:
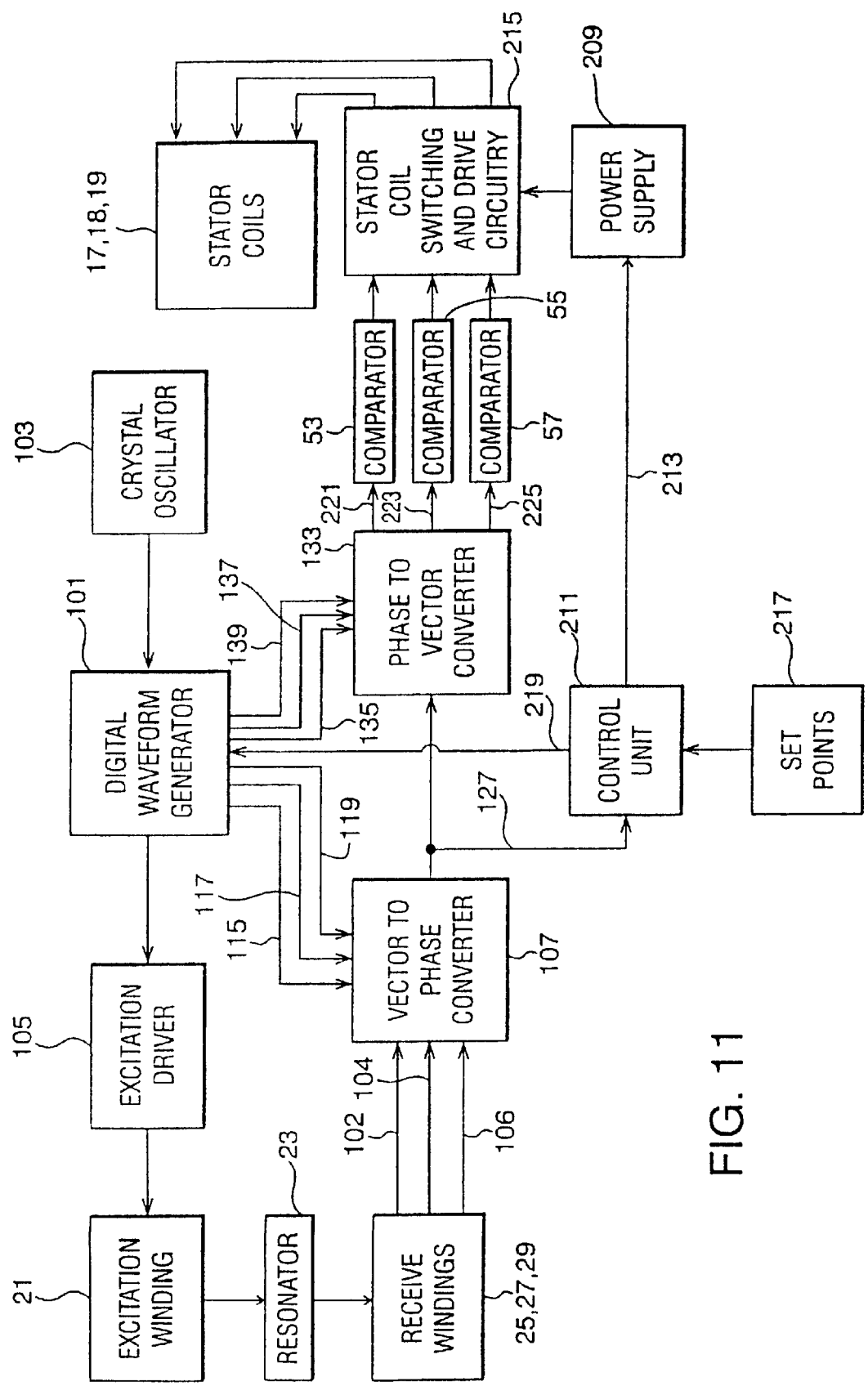
FIG. 11 is a schematic block diagram of a position encoder and associated processing circuitry which is used to control the speed and commutation of a motor.
Figure 13A:
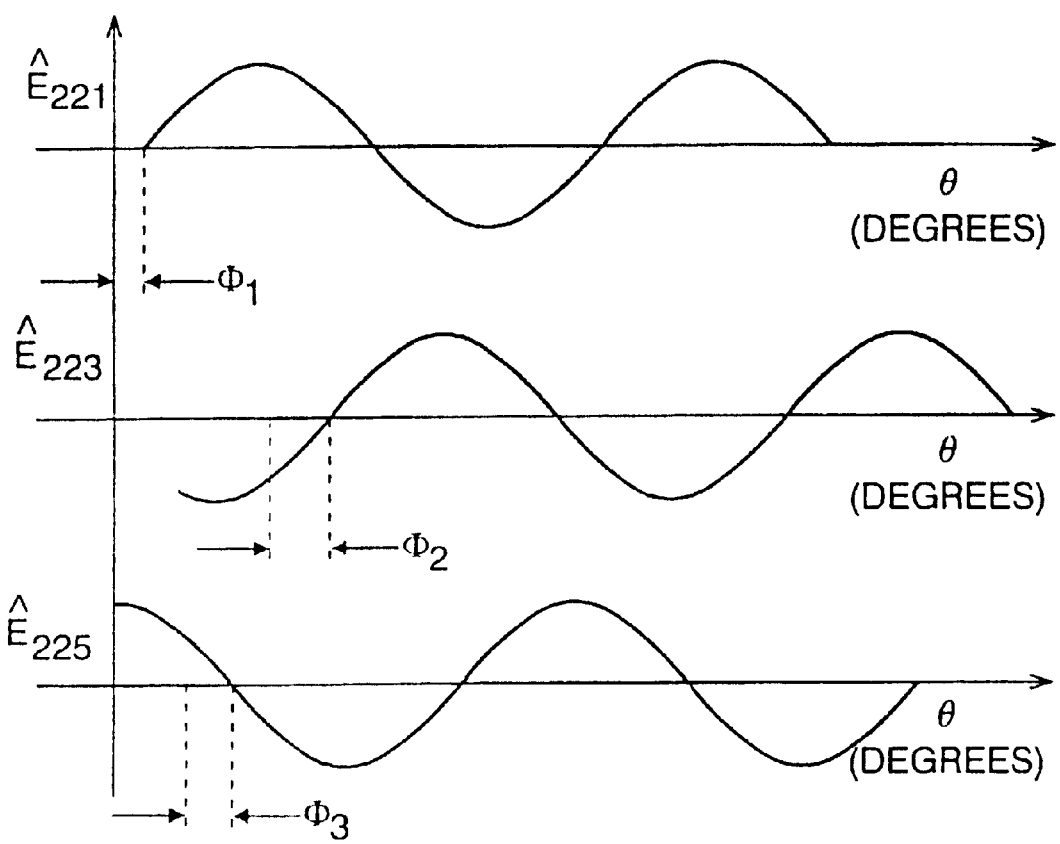
Figure 13B:
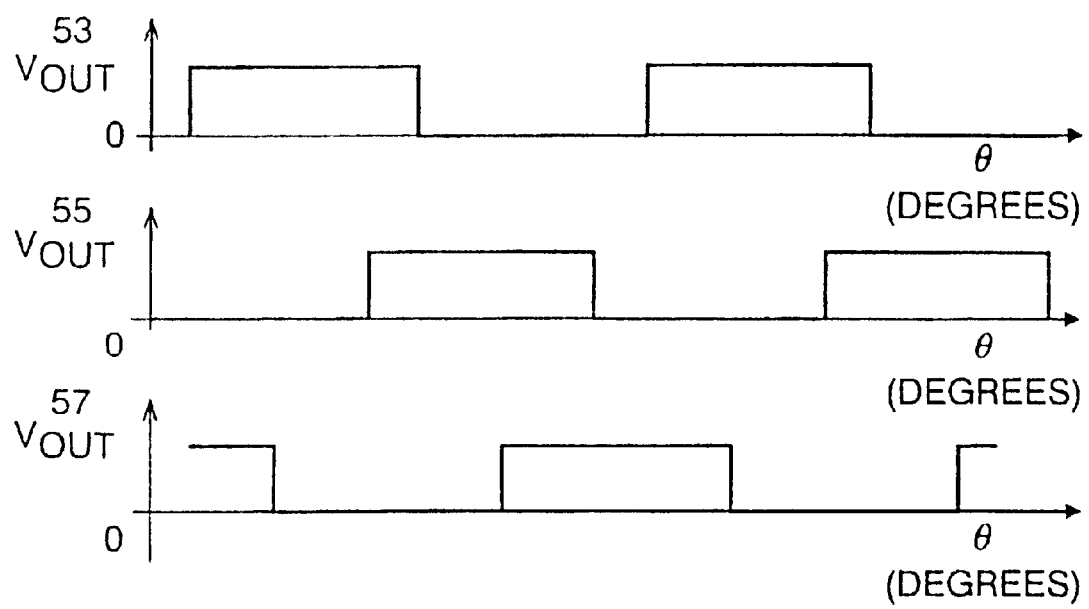

FIG. 13a illustrates the way in which the peak amplitude of the signal induced in each receive winding forming part of the position encoder shown in FIG. 11 varies with the angular position of the rotor of the motor when different phase shifts are applied to each signal; and FIG. 13b illustrates the way in which the switching control signals used to control the switching of the drive current to the stator coils vary with the angular position of the rotor when different phase shifts are applied to each signal.

Figure 1A:
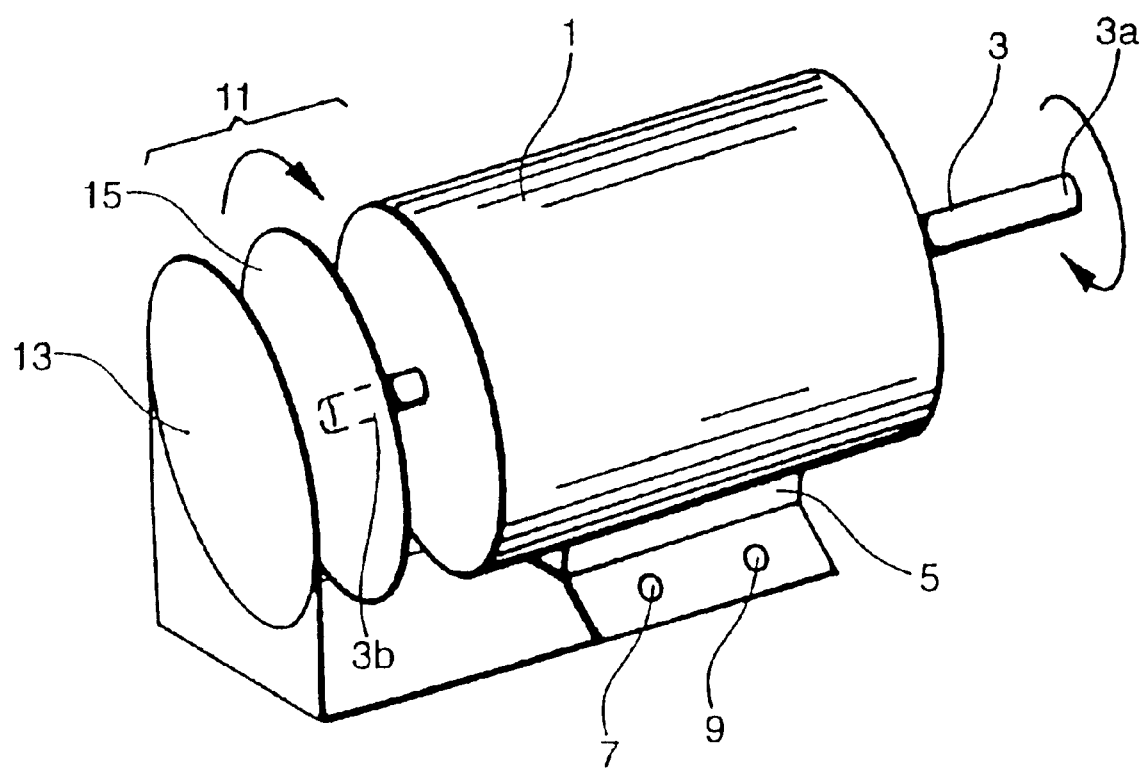
Figure 1B:
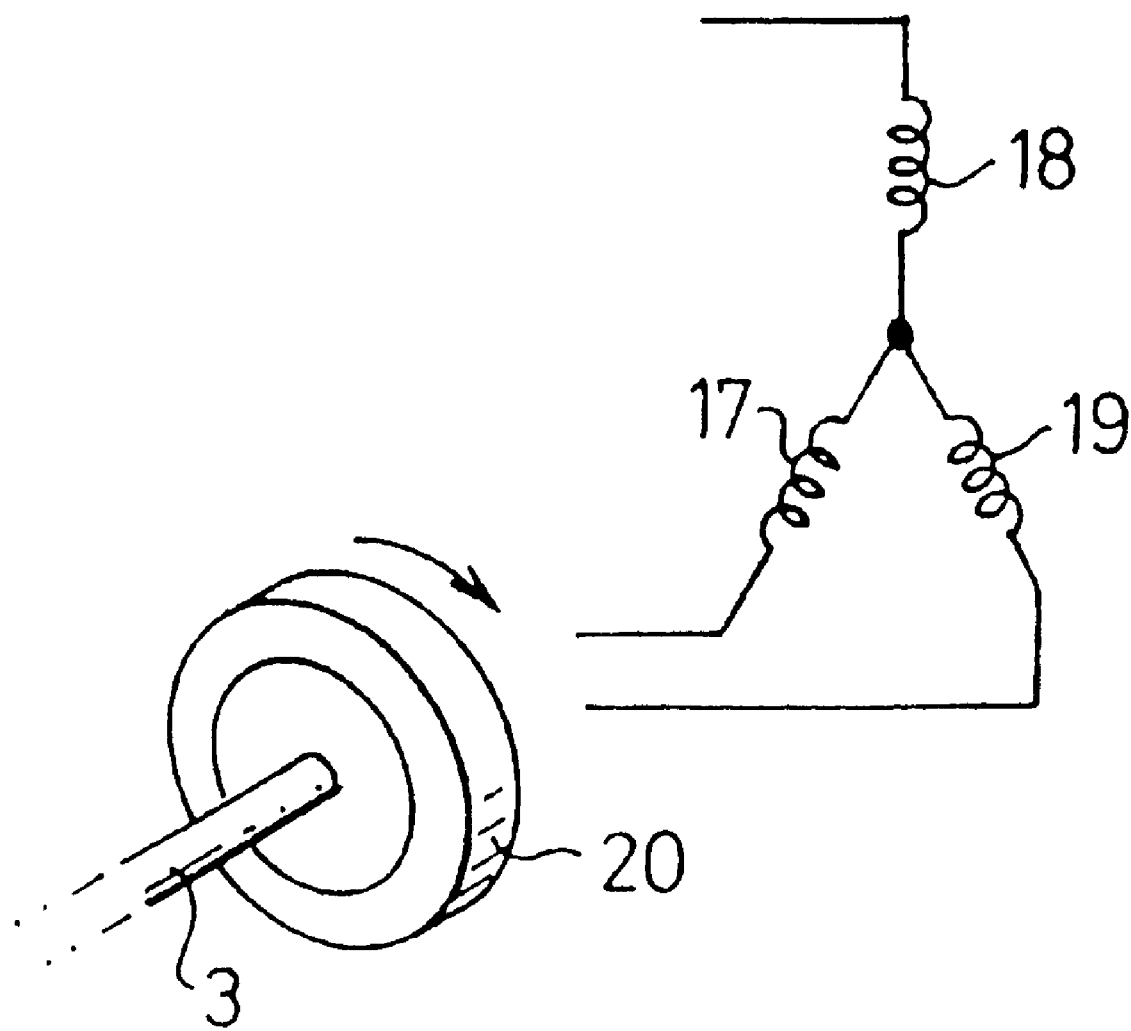

FIG. 1a schematically illustrates a brushless motor which is operable to rotate an output shaft 3 which is attached at one end 3a to a load (not shown). As illustrated in FIG. 1b, in this embodiment, the motor 1 comprises three stator coils 17, 18 and 19 which are connected in a star configuration and wound 120° apart on the stator (not shown) which surrounds the rotor 20. In this embodiment, the rotor 20 is a one-piece permanent magnet having a single North and South pole pair. The motor 1 is supported by a support 5 having mounting holes 7 and 9 which allow the motor to be secured in place. In operation, a drive current (in this embodiment a DC current (not shown)) is applied to the three stator coils in a sequence which causes the rotor to rotate. The switching sequence used depends upon the number of stator coils and the number of poles in the rotor. In order to ensure efficient operation of the motor, the timing of the stator coil switching should be in accordance with the sequence recommended by the motor manufacturer.

In this embodiment, a position encoder 11 is used to generate the appropriate switching signals which control the switching of the drive current to the stator coils. As shown in FIG. 1a, this position encoder 11 is mounted at one end of the motor 1 and comprises a first printed circuit board 13 which is fixed to the support 5 and a second printed circuit board 15 which is rotatably mounted to the end 3b of the output shaft 3. In this embodiment, the first printed circuit board 13 carries three receive windings (not shown) and an excitation winding (not shown) and the second printed circuit board 15 carries a resonator (not shown). Preferably, the separation between the printed circuit board 13 and the printed circuit board 15 is between 0.1 and 2 mm in order to obtain reasonably large signals from the receive windings.

Figure 2:
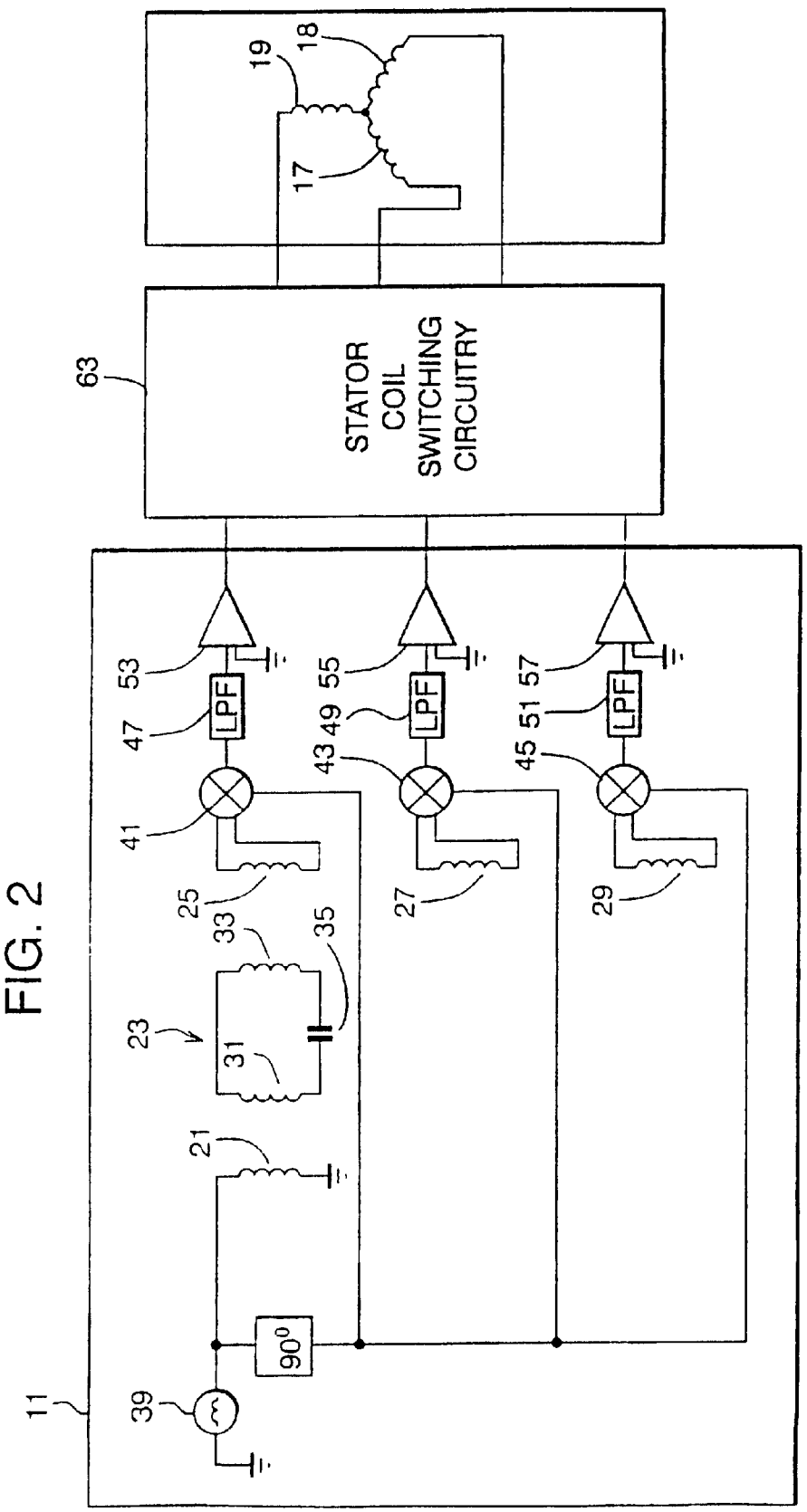
FIG. 2 is a circuit diagram illustrating how the signals from the position encoder shown in FIG. 1 are used to control the switching of the drive current to the stator coils of the motor shown in FIG. 1.

FIG. 2 is a circuit diagram which schematically shows the excitation winding 21, the resonator (generally indicated by reference numeral 23) and the receive windings 25, 27 and 29 forming part of the position encoder 11. As shown, in this embodiment, the resonator 23 comprises two series connected windings 31 and 33 and a capacitor 35. As will be explained in more detail below, the resonator winding 31 is electromagnetically coupled to the excitation winding 21 and the resonator winding 33 is electromagnetically coupled to each of the receive windings 25, 27 and 29. More specifically, the excitation winding 21 and the resonator winding 31 are arranged so that the magnetic coupling therebetween does not vary with the angular position (θ) of the resonator 23; and the resonator winding 33 and the receive windings 25, 27 and 29 are arranged so that the magnetic coupling therebetween varies sinusoidally with the angular position (θ) of the resonator 23 with the sinusoidal variation repeating once per complete revolution of the resonator.

In operation, a signal generator 39 generates a square-wave excitation signal having a fundamental frequency $F_0$ of 1 MHz, which is supplied to the excitation winding 21 for energising the resonator 23. In this embodiment, the resonator 23 has a resonant frequency which matches the fundamental frequency $F_0$ of the excitation signal, since this provides the maximum signal output levels. As the resonator resonates, a current flows through the resonator winding 33 which generates a resonator magnetic field which induces an Electro-Motive Force (EMF) in each of the receive windings 25, 27 and 29 whose amplitude sinusoidally varies as the resonator 23 rotates with the shaft 3. In order that the EMFs induced in the three receive windings 25, 27 and 29 can be used to generate the appropriate control signals for switching the drive current into the stator coils, the three receive windings are shifted circumferentially around the circuit board 13 by 120° to match the separation between the stator coils. Therefore, the EMFs induced in the receive windings 25, 27 and 29 will include the following components respectively:

$$EMF_{25} = A_0 \text{COS}[\theta]\text{COS}[2\pi F_0 t] \qquad (1)$$

$$EMF_{27} = A_0 \text{COS}\left[\theta - \frac{2\pi}{3}\right]\text{COS}[2\pi F_0 t]$$

$$EMF_{29} = A_0 \text{COS}\left[\theta - \frac{4\pi}{3}\right]\text{COS}[2\pi F_0 t]$$

These EMFs are then synchronously demodulated by multiplying them with a 90° phase shifted version of the excitation signal (to compensate for the phase change which is caused by the resonator 23) in the mixers 41, 43 and 45 respectively. The signals output by the mixers are then filtered by the low pass filters 47, 49 and 51 to remove unwanted time varying components. FIG. 3a illustrates the way in which these filtered signals $\hat{E}_{25}$, $\hat{E}_{27}$ and $\hat{E}_{29}$ vary with the rotation angle (θ) of the resonant circuit 23. As shown, each of these filtered signals varies sinusoidally with the rotation angle (θ) of the resonator 23 and repeats after each complete revolution of the shaft 3. As shown, as a result of the circumferential spacing between the receive windings, the corresponding filtered signals are 120° out of phase with the other two. The output signals from the low pass filters are then compared with ground (zero volts) in the comparators 53, 55 and 57 respectively, to generate corresponding square wave signals $V_{OUT}^{53}$, $V_{OUT}^{55}$ and $V_{OUT}^{57}$, which are shown in FIG. 3b. In this embodiment, these square wave signals $V_{OUT}^{53}$, $V_{OUT}^{55}$ and $V_{OUT}^{57}$ are used to control directly the switching of the drive current to the three stator coils 17, 18 and 19 via a stator coil switching circuit 63 which converts the square wave signals $V_{OUT}^{53}$, $V_{OUT}^{55}$ and $V_{OUT}^{57}$ into appropriate switching signals using standard logic circuits used with the Hall effect commutation systems. This is possible, because the positions of the resonator and of the receive windings have been carefully aligned with respect to the N-S poles on the rotor 20.

A brief discussion has been given above as to how an excitation signal causes a resonator to resonate which in turn generates a signal in a set of receive windings which vary with the angular position of the resonator. A more detailed explanation of how these circuits interact to generate the above signals can be found in the applicants earlier International Patent Applications WO95/31696 and WO98/00921, the contents of which are hereby incorporated by reference. A brief description of the preferred form of the excitation winding, the resonator windings and the receive windings will now be described with reference to FIGS. 4 and 5.

Figure 4A:
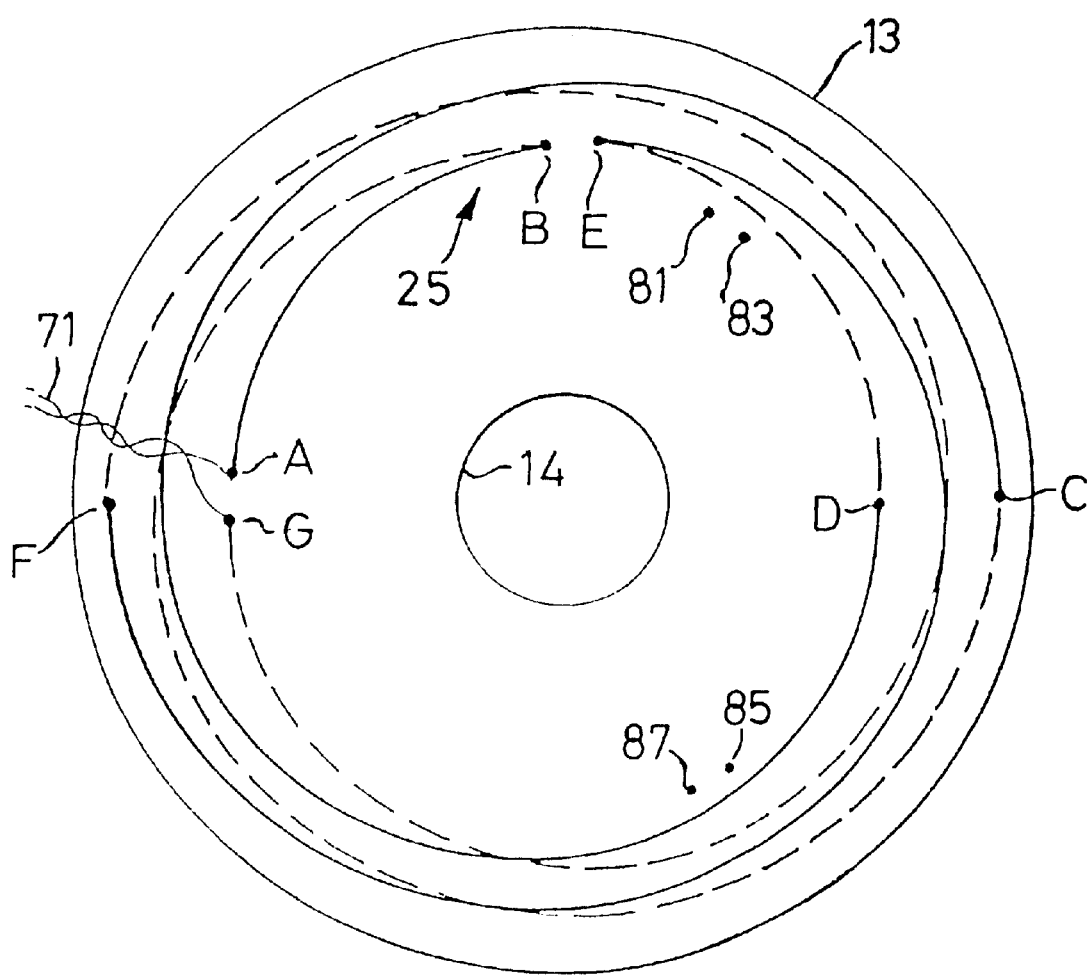
FIG. 4a is a schematic view of one of the receive windings formed on a printed circuit board which forms part of the position encoder shown in FIG. 1.

FIG. 4a illustrates the form of receive winding 25 mounted on the printed circuit board 13. As shown, the printed circuit board 13 is circular with an inner edge 14 defining a mounting hole for securing the circuit board 13 to the motor support 5. Those parts of the receive winding 25 on the top layer of the printed circuit board are shown in full lines and those on the bottom of the printed circuit board 13 are shown in dashed lines. The ends (at points A and G) of the receive winding 25 are connected to the mixer 41 (shown in FIG. 2) via the twisted wire pair 71.

As shown in FIG. 4a, the receive winding 25 is formed by a number of increasing and decreasing series connected spiral windings (relative to the centre of the printed circuit board 13). More specifically, starting at end A of the receive winding 25, the winding extends in a clockwise direction in an increasing spiral for 90°, to point B. At point B, the winding passes through to the bottom side of the printed circuit board 13 and then extends anti-clockwise in an increasing spiral over 270° to point C. At point C the winding passes back to the top layer of the printed circuit board 13 and continues anti-clockwise in a decreasing spiral over 360° to point D. At point D the winding passes back through to the bottom layer of the printed circuit board 13 and continues in an anti-clockwise direction over 90° in an increasing spiral to point E. At point E, the winding passes back to the top layer of the circuit board 13 and extends in a clockwise direction through 270° in an increasing spiral to point F. At point F, the winding passes back to the bottom layer of the circuit board 13 and continues in a clockwise direction for 360° in a decreasing spiral to the other end of the receive winding 25 at point G.

Figure 4B:
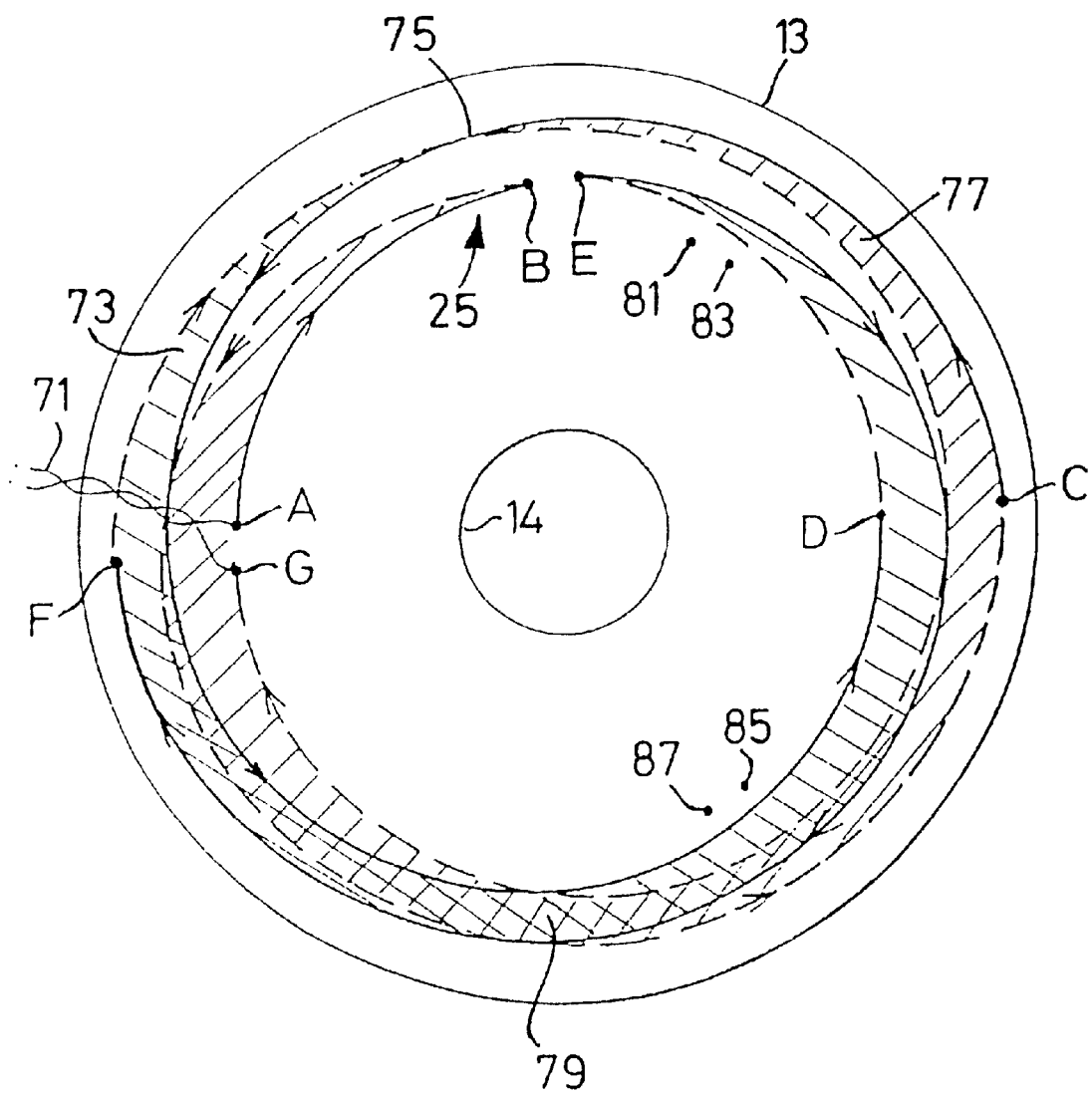
FIG. 4b is a schematic view of the receive winding shown in FIG. 4a with hatched regions of the winding identifying loops in the winding.
Figure 4C:
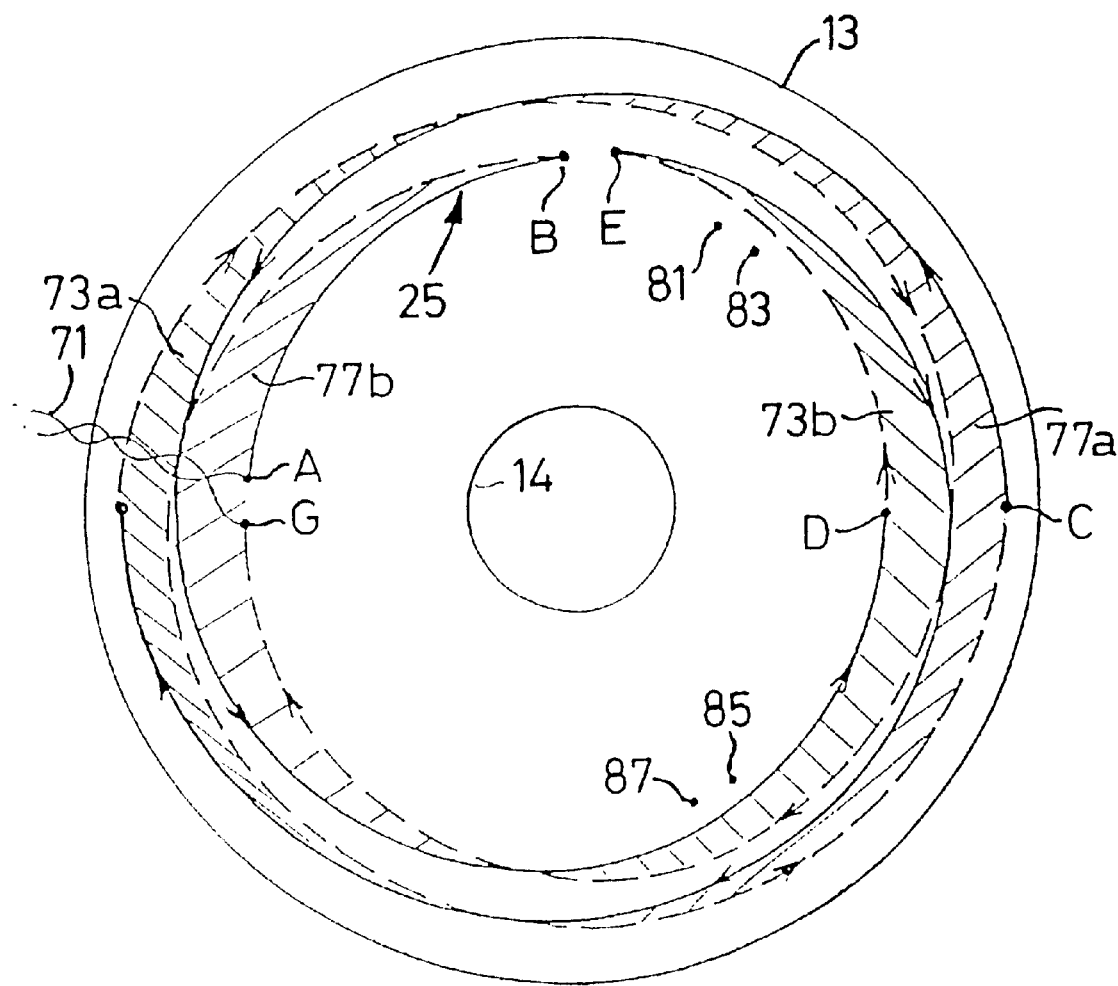
FIG. 4c is a schematic view of the receive winding shown in FIG. 4b with the hatching removed from an area where the two loops overlap.

Referring now to FIG. 4b, which shows the receive winding 25 and the direction of current flowing in each part of the winding when a current is input to the winding at point A. By considering the current flow in the winding 25, two separate loops (hatched loops 73 and 77) can be identified, both of which extend substantially over 360° and in which the direction of current flows in opposite directions. The first loop 73 extends from the winding crossover at 75 (near the outer edge of the circuit board) in an anti-clockwise direction to point E. As shown by the arrows, the current flows clockwise around loop 73. The second loop 77 formed by the receive winding 25 extends from the crossover at 75 in an anti-clockwise direction through approximately 360° to point B. As shown, the current flows in an anti-clockwise direction in loop 77. Since the currents flow in opposite directions in the two loops 73 and 77, no EMF will be induced in the overlap region 79 of these loops, since the EMF induced in one loop will cancel with the EMF induced in the other. Therefore, each of the loops 73 and 77 effectively comprise four "sensing" regions 73a, 73b and 77a and 77b, which are shown in FIG. 4c. These four regions 73a, 73b, 77a and 77b represent the parts of the receive winding 25 which are sensitive to electromagnetic fields generated by the resonator 23.

The conductors of the receive winding 25 which define these regions are arranged so that they each cover approximately the same area. This makes the receive winding 25 relatively immune to background electromagnetic interference. In particular, if a common magnetic field is incident over each of these regions, then the EMF induced in regions 73a and 73b will cancel with the EMF induced in regions 77a and 77b (since the alternate sense loops 73 and 77 are connected in series).

Figure 4D:
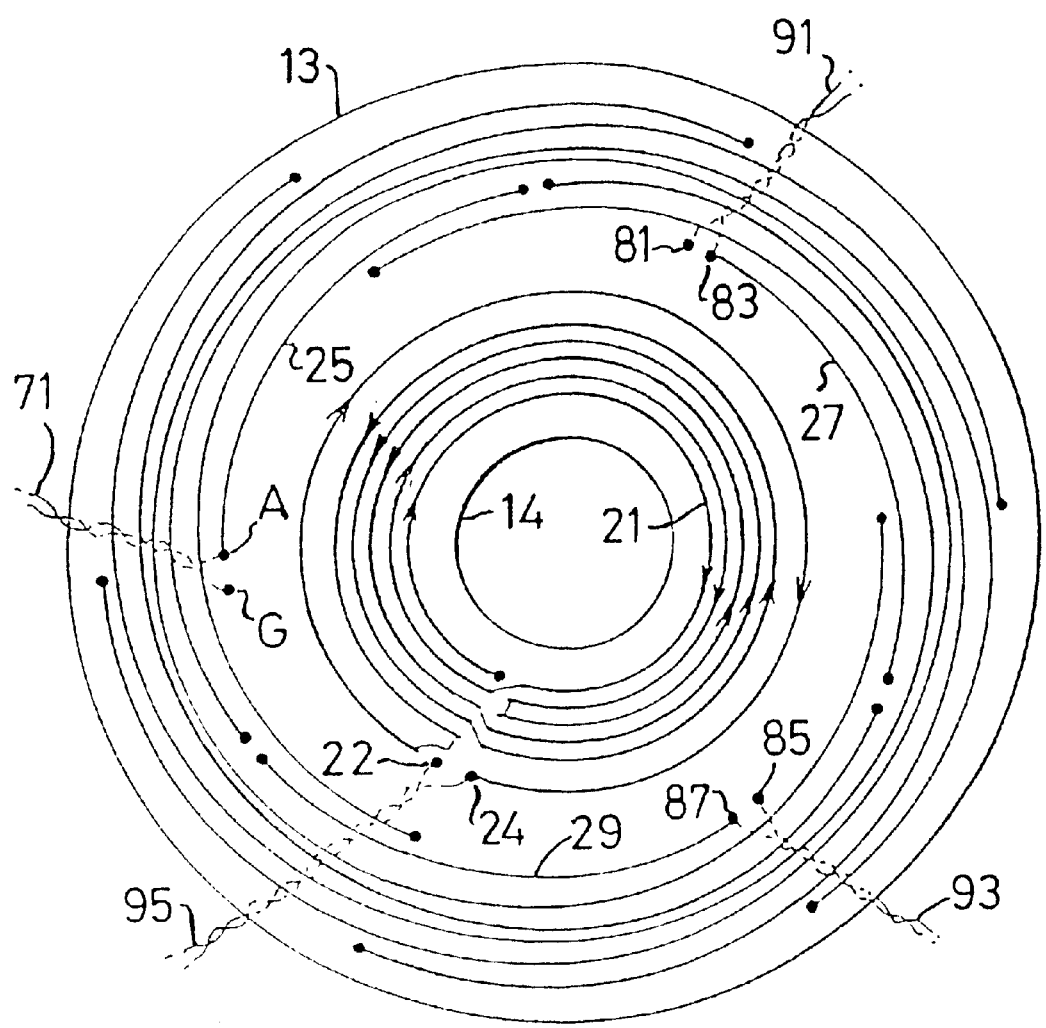

The other two receive windings 27 and 29 each have the same form as receive winding 25 but are circumferentially shifted by ±120° relative to receive winding 25. Receive windings 27 and 29 have not been illustrated in FIGS. 4a, b or c for clarity. However, the ends of receive winding 27 are shown at points 81 and 83 and the ends of receive winding 29 are shown at points 85 and 87. The top layer of conductors on the printed circuit board 13, which shows the conductors for the receive windings 25, 27 and 29 and for part of the excitation winding 21, is shown in FIG. 4d. As shown, the ends 81 and 83 of receive winding 27 are connected to the twisted wire pair 91 which connects the winding to mixer 43; the ends 85 and 87 of receive winding 29 are connected to the twisted wire pair 93 which connects the winding to mixer 45; and the ends 22 and 24 of the excitation winding 21 are connected to the twisted wire pair 95 which connects the winding to the signal generator 39.

Figure 4E:
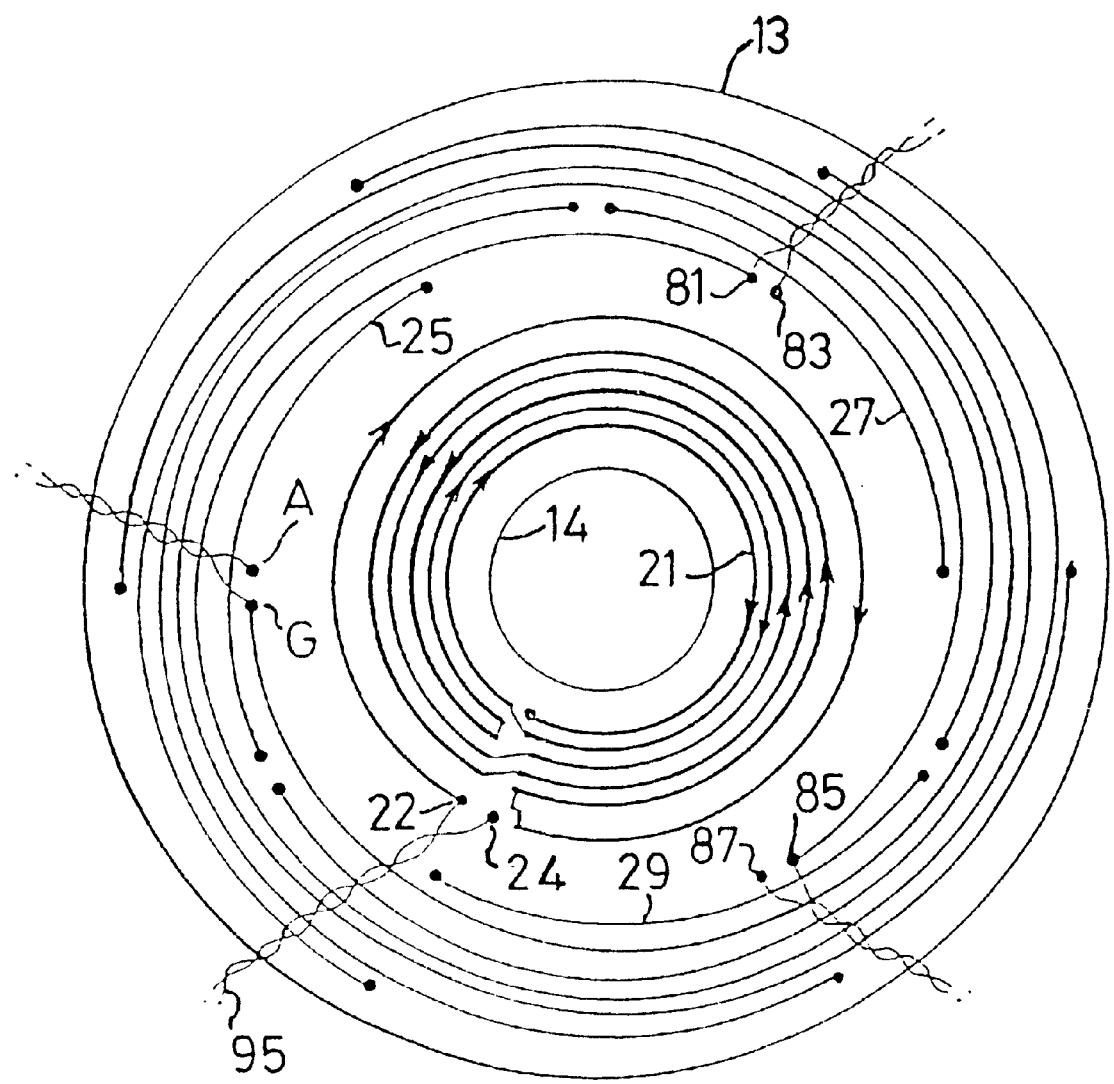

FIG. 4e shows the bottom layer of the circuit board 13. In order to facilitate comprehension, the bottom layer of the circuit board 13 has been shown as it would be seen from the top layer. As shown in FIGS. 4d and 4e, the excitation coil 21 comprises six loops of conductor on both the top and bottom layers of the printed circuit board 13. As represented by the arrows on the winding 21, the loops of the excitation winding are arranged so that current flows in different directions in the different loops. In particular, with the current directions illustrated, current flows clockwise in the outer loop, it then flows anti-clockwise in the next three loops and finally clockwise on the two inner loops. As can be seen from FIG. 4d and 4e, the winding directions of the loops on the two sides of the circuit board 13 are the same. The area enclosed by each loop of the excitation winding 21 is arranged so that if there is far field electromagnetic interference (so that the same interference is experienced by each loop), then the EMFs induced in the six loops on each side of the circuit board 13 will substantially cancel each other out, thereby making the excitation winding relatively immune to such background electromagnetic interference. The winding direction of and the spacing between each loop has also been arranged so that the magnetic field generated by a current flowing in the excitation winding is a maximum inside the annulus defined between the largest winding loop and the smallest winding loop and a minimum outside this annulus, so as to minimise any cross coupling between the excitation winding 21 and the receive windings 27, 27 and 29 and between the excitation winding 21 and the rotating shaft.

Figure 5A:
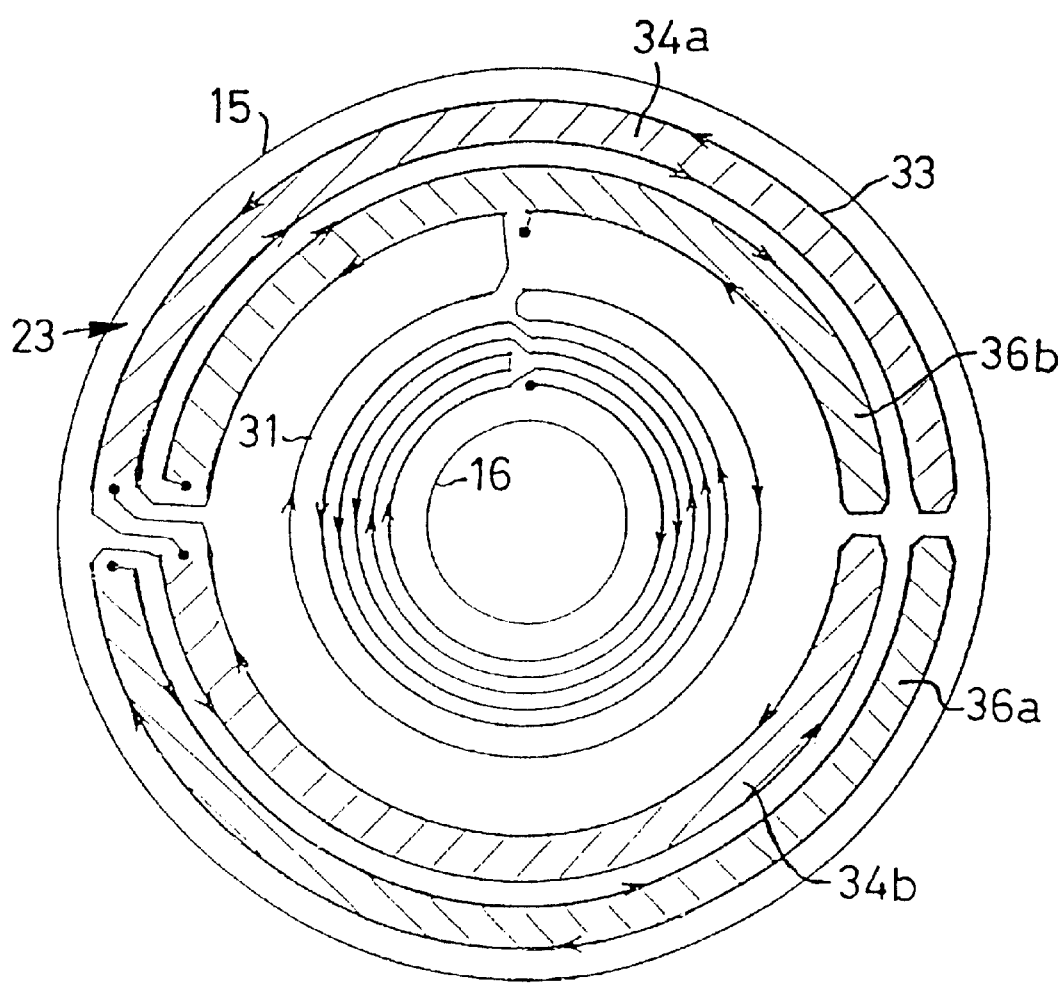
FIG. 5a is a schematic view of a top layer of printed conductors which is part of a resonator which forms part of the position encoder shown in FIG. 1.
Figure 5B:
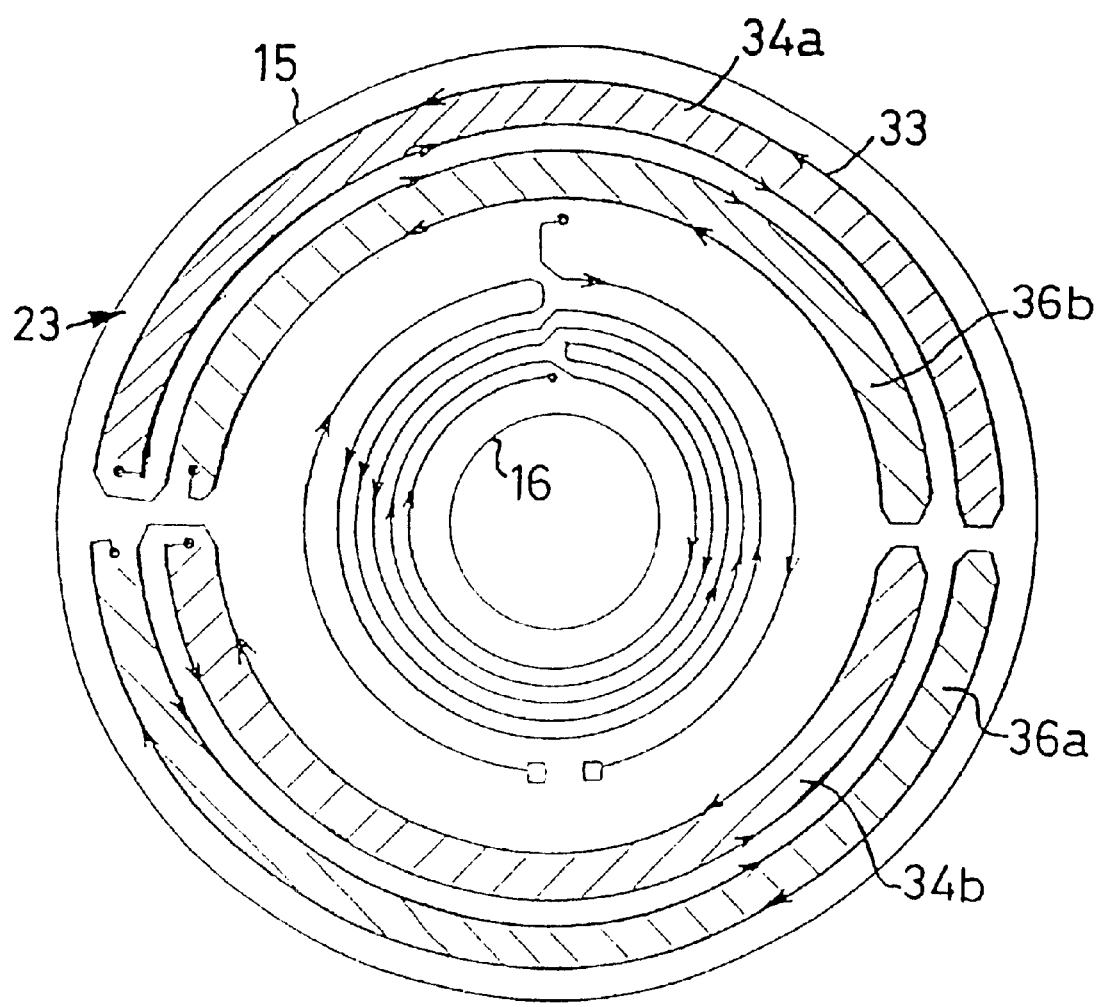
FIG. 5b shows the bottom layer of printed conductors which is part of the resonator which forms part of the position encoder shown in FIG. 1.

Referring now to FIG. 5, FIGS. 5a and 5b show respectively the top and bottom layer of the printed circuit board 15 which carries the resonator 23. For clarity, the bottom layer of the printed circuit board 15 has been shown as it would be seen from the top layer. As shown in FIG. 5, the circuit board 15 is circular having a central hole, defined by an inner edge 16 of the board, for receiving the shaft 3 of the motor 1. The resonator 23 comprises two series connected windings 31 and 33 on each side of the circuit board. Winding 31 is located toward the centre of the printed circuit board 15 and winding 33 is located towards the outer edge the circuit board 15. As shown in FIG. 5b, two connection pads 42 and 44 are provided on the outer loop of winding 31 for receiving and connecting a surface mount capacitor in series with the two windings 31 and 33.

As shown in FIGS. 5a and 5b, winding 31 is wound in the same way in which the excitation winding 21 is wound on the printed circuit board 13. This ensures that this portion of the resonator is immune to background electromagnetic fields and provides a constant magnetic coupling between the excitation winding 21 and the resonator 23 irrespective of the resonator's angular position. Further, the outer winding 33 of the resonator 23 comprises four loops of conductor 34a, 34b, 36a and 36b on each side of the printed circuit board 15. As shown by the arrows and as represented by the different hatching lines, loops 34a and 34b are wound in the opposite sense to loops 36a and 36b. The area enclosed by each of the loops 34 and 36 is arranged to be the same so that the outer winding 33 of the resonator 23 is also relatively immune to background electromagnetic interference.

As those skilled in the art will appreciate from a comparison of FIGS. 5a and 5b with FIG. 4c, when the circuit board 15 is rotatably mounted on the shaft 3 and the circuit board 13 is mounted adjacent the shaft so that the inner edge of the circuit board 14 is concentric with the inner edge 16 of the circuit board 15, the loops 34a and 36a are arranged to interact with the areas 73a and 77a of the receive windings and loops 34b and 36b are arranged to interact with the loops 73b and 77b. In particular, these loops are arranged so that as the resonator rotates, the electromagnetic coupling between the loops 34 and 36 of the resonator 23 and the areas 73 and 77 of the receive windings varies sinusoidally with the resonator rotation angle (θ), with the period of the sinusoidal variation being equal to one complete revolution of the circuit board 15.

Various other designs for the receive windings 25, 27 and 29 (which are also immune to electromagnetic interference) and for the resonator 23 can be used which will generate such a sinusoidal variation with the rotation of the resonator board 15. Examples of such designs can be found in, for example, the applicants earlier International Patent Applications mentioned above. However, the above design is preferred because each of the receive windings, energising winding and the resonator windings are substantially immune to electromagnetic interference because they each comprise a number of series connected loops wound in the opposite sense. Furthermore, the pattern of receive windings and resonator windings used in this embodiment has the further advantages that the sensitivity to magnetic field of the receive windings is more concentrated in the area in which the receive windings are located because each of the "sensing" regions 73a, 73b, 77a and 77b are located next to another region of opposite electromagnetic sensitivity (which reduces interference caused by direct coupling between the excitation winding and the receive windings); and that the receive windings are less sensitive to lateral movement of the resonator 15 (which would normally translate into an apparent angular shift in the resonator position.

As can be seen from the above embodiment, the signals output from the rotary position encoder 11 are used to directly control the switching of the drive current to the stator windings 67, 69 and 71 via standard logic circuitry without the need for a microprocessor to control the switching. This is possible because the geometry of the receive windings 25, 27 and 29 matches the geometry of the stator coils in terms of the number of phases (i.e. there are three receive windings and three stator coils) and poles (i.e. the number of periods of each receive winding around the circumference of the printed circuit board 13 matches the number of N-S pole pairs around the circumference of the rotor).

The advantages of the above embodiment over the prior art systems which use Hall effect, resolvers and/or optical position encoders include:

i) high frequency AC excitation fields are used which allows faster operation than conventional resolvers. This is possible because the system uses simple printed circuit board windings rather than iron-cored receive coils.

ii) Because of the symmetrical arrangement of the receive circuits and of the resonator, the position encoder is less sensitive to misalignment and leads to higher accuracy which is necessary for efficient driving of switched reluctance motors.

Other more general advantages include that it is a cheap contactless encoder which is relatively immune to interference from background magnetic fields and it does not require a microprocessor to control the motor's commutation. This therefore allows the system to operate at higher speeds and saves cost.

Modifications and Alternative Embodiments

In the above embodiment, the windings of the resonator on the circuit board 15 and the receive windings on the circuit board 13 must be aligned properly with respect to the position of the N-S poles on the rotor, so that the phase of the output signals from the comparators directly maps to the correct switching angle for switching the drive current to the stator coils. It is possible, however, with suitable processing of the signals from the receive windings to effectively change the phase of the comparator output signals so that this alignment becomes unnecessary. The way in which this is achieved in a second embodiment will now be described with reference to FIGS. 6 to 8. In the second embodiment, the excitation, resonator and receive windings are the same as those used in the first embodiment.

Figure 6:
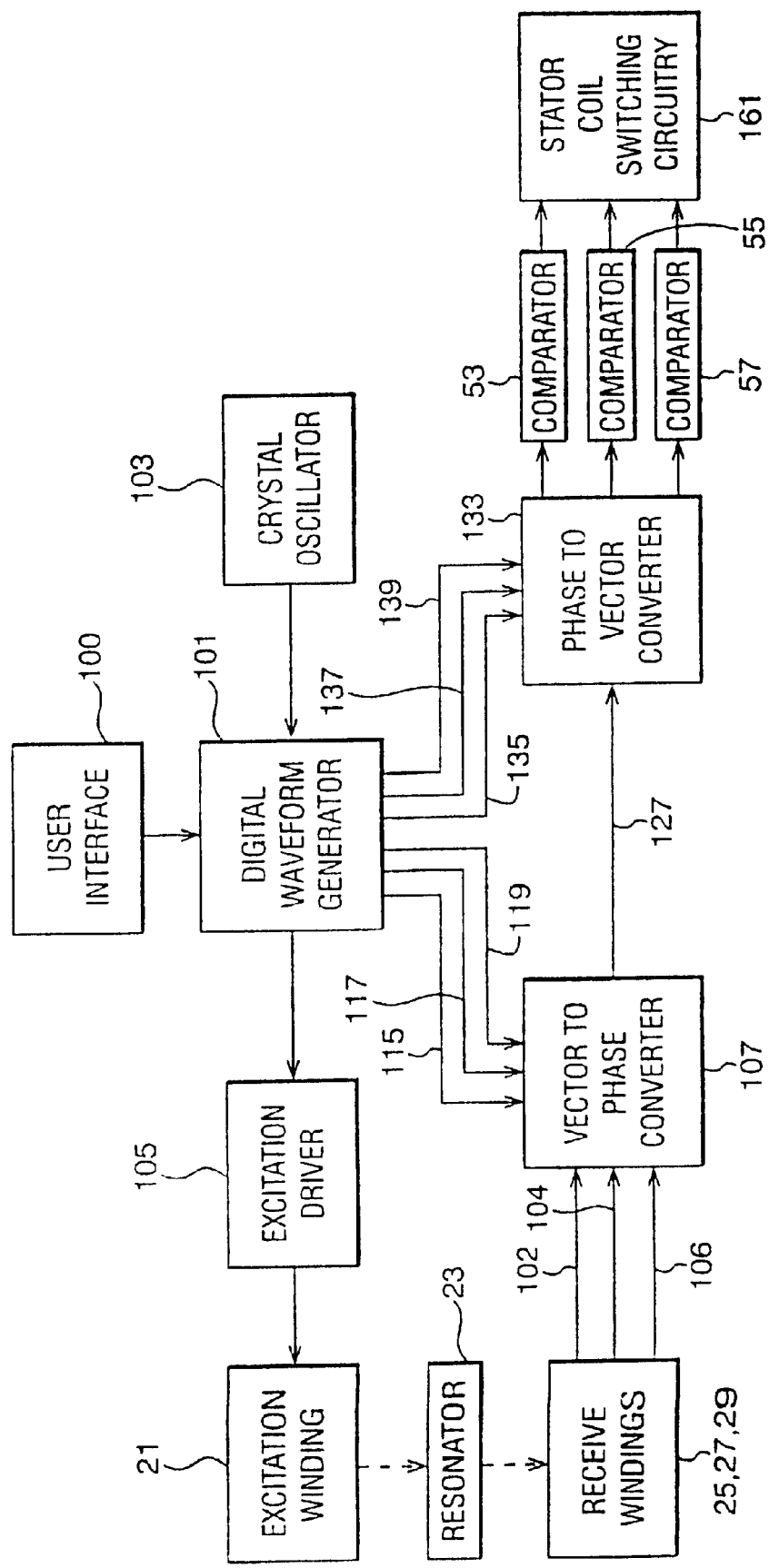
FIG. 6 is a schematic block diagram illustrating a position encoder and processing circuitry used to generate control signals for controlling the switching of the drive current to the stator coils of the motor.

In the embodiment shown in FIG. 6, the excitation signal is generated by the digital waveform generator 101 which receives an oscillating input from a crystal oscillator 103. In this embodiment, the excitation signal is a squarewave voltage having a fundamental frequency $F_0$ of 1 MHz which is applied to an excitation driver 105 which energises the excitation winding 21. This causes the resonator 23 to resonate, which in turn generates a magnetic field which induces an EMF in each of the receive windings 25, 27 and 29. As in the first embodiment, the EMFs generated in the receive windings include the components given in equation 1 above. These three EMFs 102, 104 and 106 are input to a vector-to-phase converter 107 which combines the three EMFs in order to generate a single sinusoidally time-varying signal whose phase varies in dependence upon the angular position (θ) of the resonator 23 relative to the receive windings 25, 27 and 29.

Figure 7:
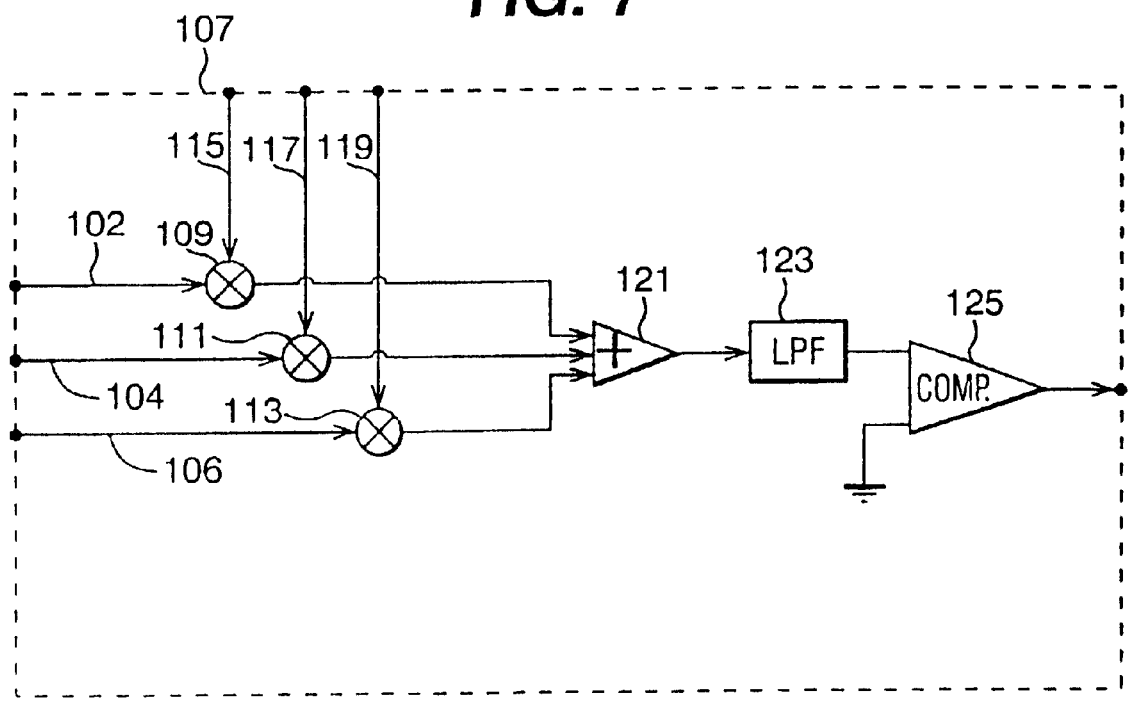
FIG. 7 is a circuit diagram of a vector-to-phase converter forming part of the processing circuitry shown in FIG. 6.

FIG. 7 illustrates the way in which the vector-to-phase converter 107 is arranged in this embodiment. As shown, the induced EMFs 102, 104 and 106 are applied to mixers 109, 111 and 113 respectively, where they are multiplied with mixing signals 115, 117 and 119 respectively. Each of the mixing signals 115, 117 and 119 comprises two periodic time-varying components. The first component ($V_1$) is the same for each mixer and is a squarewave voltage corresponding to the squarewave voltage applied to the excitation winding 21 but having a 90° offset to compensate for the phase change due to the resonator 23. The second component ($V_2$) is also a squarewave voltage but has a lower fundamental frequency $F_{IF}$ of 10.417 KHz than that of the excitation signal and has a different phase for each mixer. In particular, the phase of each second component is chosen to match the phase of the corresponding receive EMF signal.

The first component effectively demodulates the amplitude modulated EMF induced in the corresponding receive winding and the second component re-modulates it to an intermediate frequency $F_{IF}$.

The advantage of using squarewave signals for mixing with the incoming signal from the corresponding receive winding is that the digital waveform generator 61 can multiply these two signals together by simply performing an exclusive-or (XOR) function on the two squarewave components. This is because the high level of the squarewave signal represents +1 and the low level represents −1. This can be easily verified by considering the truth table of an XOR gate. Additionally, by using squarewave mixing signals, the mixers 109, 111 and 113 can be implemented using an analogue CMOS IC switch.

As those who are familiar with Fourier analysis of signals will appreciate, a periodic squarewave signal can be represented by the sum of a fundamental sinusoid having the same period as the squarewave and higher order odd harmonics of the fundamental frequency. Therefore, the multiplication being performed in the mixers 109, 111 and 113 can be expressed as follows:

$$M_{109} = (A_0 \text{COS}[\theta]\text{COS}[2\pi F_0 t]) \times \qquad (2)$$
$$(\text{COS}[2\pi F_0 t] + ODD\ HARMONICS) \times$$
$$(\text{COS}[2\pi F_{IF} t] + ODD\ HARMONICS)$$

$$M_{111} = \left(A_0 \text{COS}\left[\theta - \frac{2\pi}{3}\right]\text{COS}[2\pi F_0 t]\right) \times$$
$$(\text{COS}[2\pi F_0 t] + ODD\ HARMONICS) \times$$
$$\left(\text{COS}\left[2\pi F_{IF} t - \frac{2\pi}{3}\right] + ODD\ HARMONICS\right)$$

$$M_{113} = \left(A_0 \text{COS}\left[\theta - \frac{4\pi}{3}\right]\text{COS}[2\pi F_0 t]\right) \times$$
$$(\text{COS}[2\pi F_0 t] + ODD\ HARMONICS) \times$$
$$\left(\text{COS}\left[2\pi F_{IF} t - \frac{4\pi}{3}\right] + ODD\ HARMONICS\right)$$

Performing this multiplication and rearranging the terms (ignoring the high-frequency odd harmonics) results in the following expressions for the outputs $M_{109}$, $M_{111}$ and $M_{113}$ of the mixers 109, 111 and 113:

$$M_{109} = \frac{A_0}{4}(\text{COS}[2\pi F_{IF} t + \theta] + \text{COS}[2\pi F_{IF} t - \theta]) \qquad (3)$$

$$M_{111} = \frac{A_0}{4}\left(\text{COS}\left[2\pi F_{IF} t + \theta - \frac{2\pi}{3}\right] + \text{COS}\left[2\pi F_{IF} t - \theta + \frac{2\pi}{3}\right]\right)$$

$$M_{113} = \frac{A_0}{4}\left(\text{COS}\left[2\pi F_{IF} t + \theta - \frac{4\pi}{3}\right] + \text{COS}\left[2\pi F_{IF} t - \theta + \frac{4\pi}{3}\right]\right)$$

These signals are then added together in the adder 121 to give:

$$V_{OUT} = \frac{3A_0}{4}(\text{COS}[2\pi F_{IF} t - \theta]) \qquad (4)$$

Therefore, the output signal $V_{OUT}$ from the adder 121 includes a single sinusoid at the intermediate frequency $F_{IF}$ whose phase varies with the angular position (θ) of the rotatable shaft 3. As those skilled in the art will appreciate, the other intermediate frequency components cancel due to the particular choice of the phase of each of the intermediate frequency mixing signals. The output $V_{OUT}$ from the adder 121 will also contain high frequency odd harmonic components, but these are removed by the low pass filter 123. The single intermediate frequency component in $V_{OUT}$ is then converted into a corresponding squarewave by comparing it with zero volts in the comparator 125. More detail of the above processing can be found in the Applicant's earlier International Patent Application WO98/00921. This earlier application also describes other phases which can be used which will result in a single output signal from the adder 121.

Figure 8:
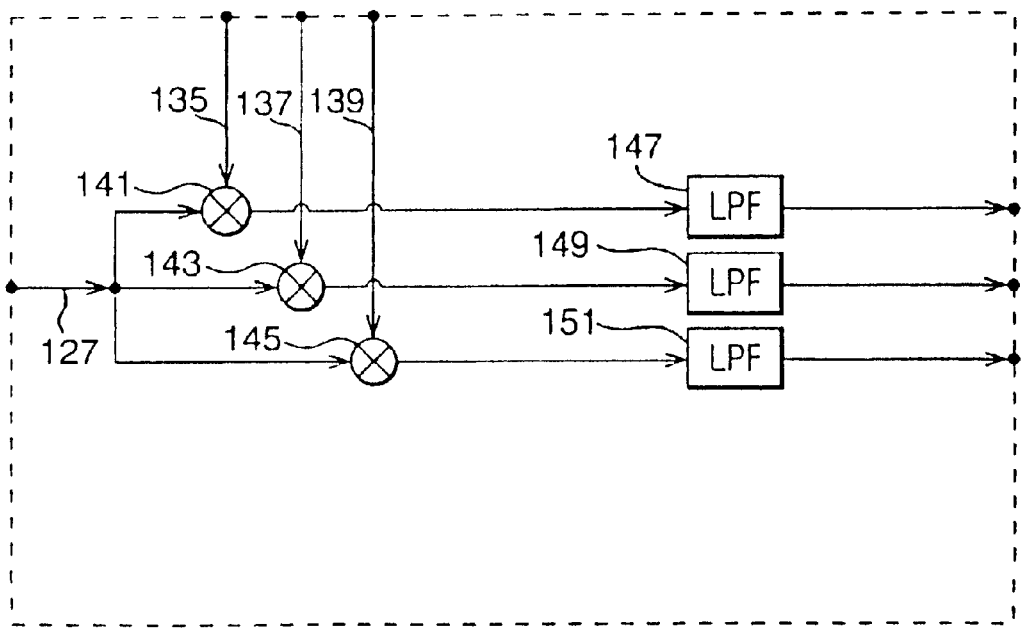
FIG. 8 is a circuit diagram of a phase-to-vector converter forming part of the processing circuitry shown in FIG. 6.

The squarewave phase signal 127 output by the vector-to-phase converter is then passed to a phase-to-vector convertor 133 which converts the phase signal back into three vector signals by multiplying the phase signal with three separate mixing signals 135, 137 and 139 generated by the digital waveform generator 101. FIG. 8 shows in more detail the components of the phase-to-vector converter 133. As shown, the squarewave phase signal 127 is applied to mixers 141, 143 and 145 where they are respectively mixed with the mixing signals 135, 137 and 139. The mixing signals 135, 137 and 139 are squarewave signals having the same fundamental frequency $F_{IF}$ as the squarewave phase signal 127, but having different phases chosen to ensure the correct switching timing is achieved. (These phases can be set during manufacture by an operator programming the digital waveform generator 101 via the user interface 100.) In this embodiment, the mixing signals 135, 137 and 139 have the following form:

$$S_{135} = \cos[2\pi F_{IF} - \phi] \tag{5}$$

$$S_{137} = \cos\left[2\pi F_{IF} - \left(\phi + \frac{2\pi}{3}\right)\right]$$

$$S_{139} = \cos\left[2\pi F_{IF} - \left(\phi + \frac{4\pi}{3}\right)\right]$$

where $\phi$ is the phase shift required to ensure the correct switching timing is achieved. Therefore, after multiplication and rearranging the terms, the mixer output signals are given by:

$$M_{135} = \cos[\theta - \phi] + \text{time varying components} \tag{6}$$

$$M_{137} = \cos\left[\theta - \left(\phi + \frac{2\pi}{3}\right)\right] + \text{time varying components}$$

$$M_{139} = \cos\left[\theta - \left(\phi + \frac{4\pi}{3}\right)\right] + \text{time varying components}$$

These signals are then filtered by a respective low pass filter 147, 149 and 151 which remove the time-varying components to leave the three components which vary out of phase with respect to each other with the angular position (θ) of the shaft 3.

As shown in FIG. 6, the signals output from the phase-to-vector converter 133 are then passed to a respective comparator 53, 55 and 57 where the sinusoidally varying components are converted into corresponding squarewave signals which are used to control directly the stator coil switching circuitry 161.

In the above embodiment, the digital waveform generator 101 was used to add a factory set phase change (φ) to the control signals used for controlling the stator coil switching circuitry. As mentioned above, this alleviates the need to accurately align the resonator with the rotor. A similar phase change could be achieved by passing the phase signal 127 output by the vector-to-phase converter 107 through a phase shift device or by using a different phase in the mixing signals used in the vector to phase converter, prior to remultiplication by the phase shifted intermediate signals to regenerate the three vector signals.

Figure 9:
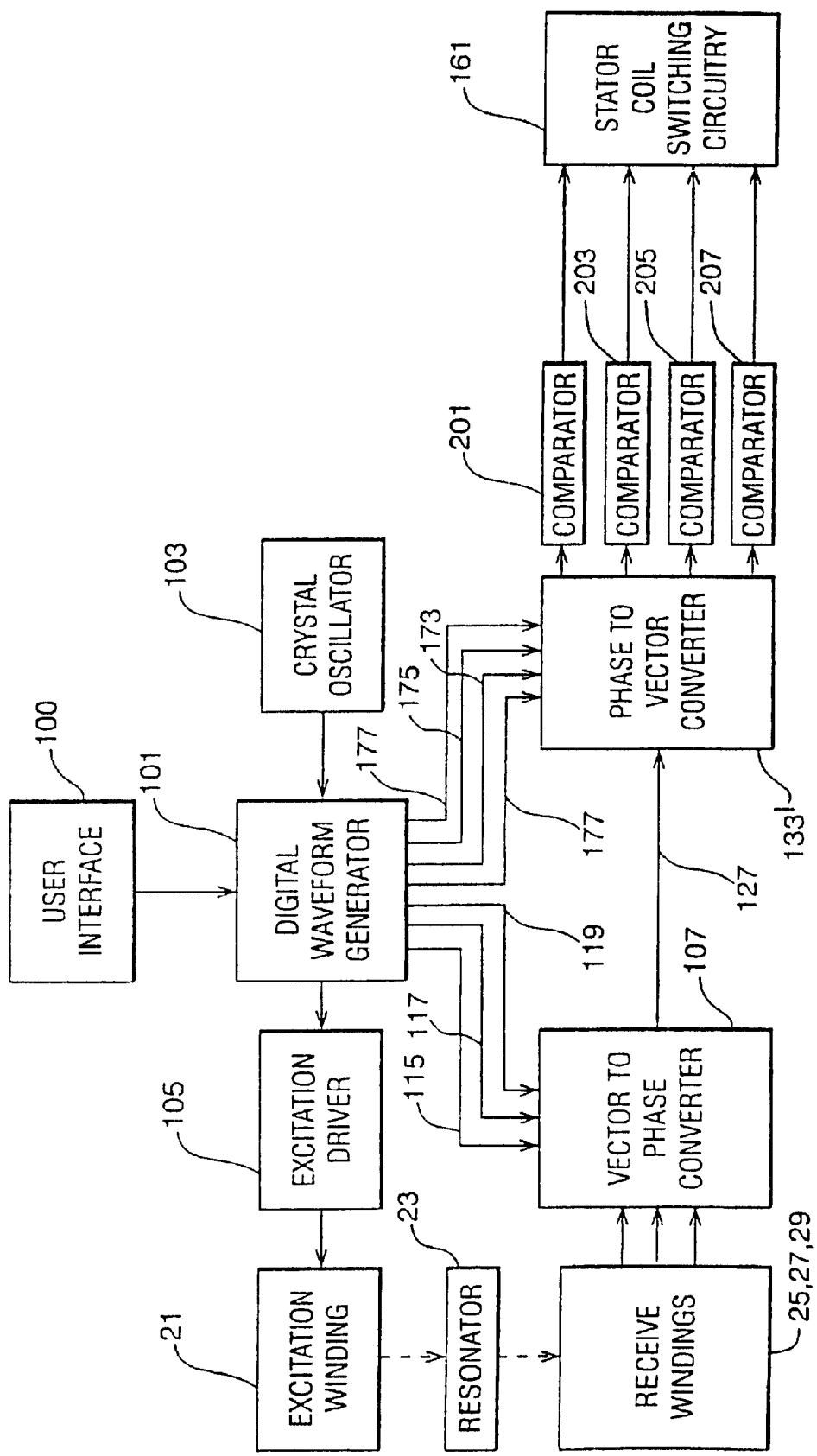
FIG. 9 is a schematic block diagram of a position encoder and associated processing circuitry which is used to control the commutation of a motor.
Figure 10:
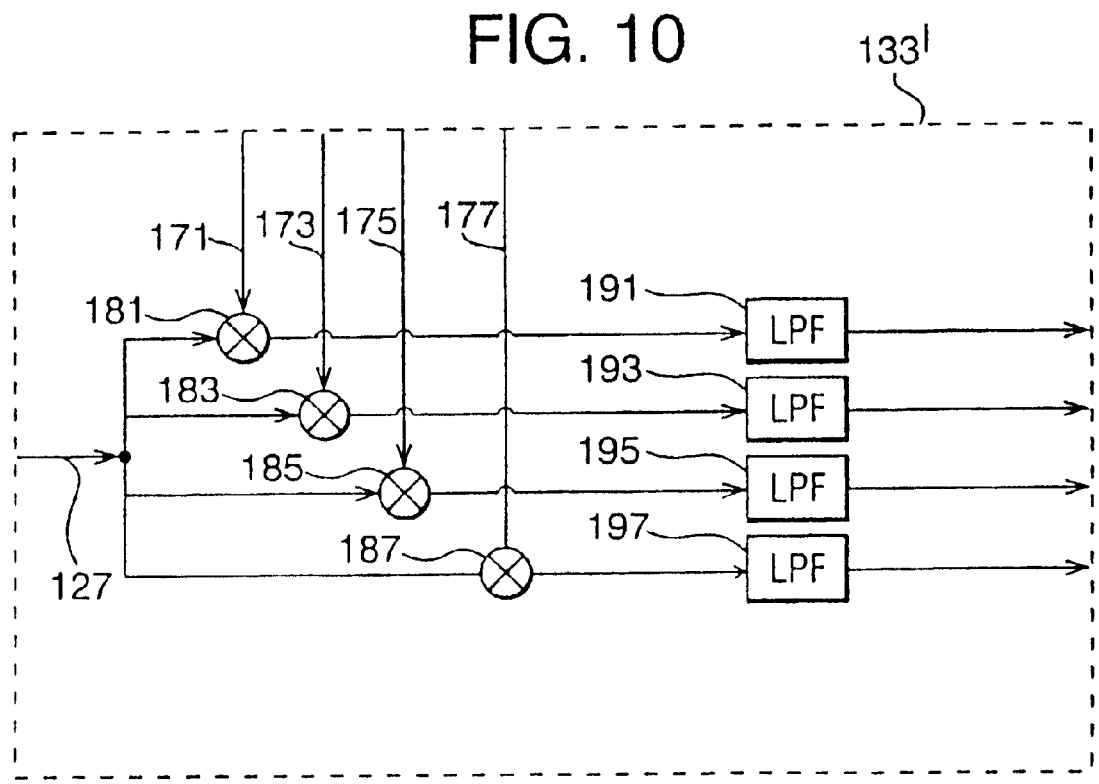
FIG. 10 is a circuit diagram of a phase-to-vector converter forming part of the processing circuitry shown in FIG. 1.

In the above embodiments, the number of receive windings matched the number of stator coils. As discussed above, this allows the signals from the receive windings to be used to control directly the switching of the drive current to the stator coils. However, with the vector-to-phase and the phase-to-vector converters of the second embodiment described above with reference to FIG. 6, this is no longer necessary. This is because the phase-to-vector converter can be arranged to output any number of vector signals with any phase relationship. For example, FIG. 9 illustrates the processing circuitry for an embodiment in which there are four stator windings (not shown) evenly separated around the rotor, but which uses a position encoder having three windings. As shown, in this embodiment, the digital waveform generator generates four signals 171, 173, 175 and 177 for mixing with the phase signal 127 output by the vector-to-phase converter 107. FIG. 10 illustrates in more detail the components of the phase-to-vector converter 133' in this embodiment. As shown, the phase-to-vector converter comprises four mixers 181, 183, 185 and 187 for mixing the phase signal 127 with the following four mixing signals 171, 173, 175 and 177:

$$S_{171} = \cos[2\pi F_{IF} - \phi] \tag{7}$$

$$S_{173} = \cos\left[2\pi F_{IF} - \left(\phi + \frac{\pi}{2}\right)\right]$$

$$S_{175} = \cos[2\pi F_{IF} - (\phi + \pi)]$$

$$S_{177} = \cos\left[2\pi F_{IF} - \left(\phi + \frac{3\pi}{4}\right)\right]$$

which results in the following four mixer output signals $M_{171}$, $M_{173}$, $M_{175}$ and $M_{177}$:

$$M_{171} = \cos[\theta - \phi] + \text{time varying components} \tag{8}$$

$$M_{173} = \cos\left[\theta - \left(\phi + \frac{\pi}{2}\right)\right] + \text{time varying components}$$

$$M_{175} = \cos[\theta - (\phi + \pi)] + \text{time varying components}$$

$$M_{177} = \cos\left[\theta - \left(\phi + \frac{3\pi}{4}\right)\right] + \text{time varying components}$$

These output signals are then filtered in filters 191, 193, 195 and 197 to remove the time varying components. The filtered signals are then passed to a respective comparator 201, 203, 205 and 207 which generates corresponding squarewave signals which are used to control directly the switching of the drive current into the four stator coils.

In the above embodiment, a phase shift was electronically added by an operator in a factory changing the signals generated by the digital waveform generator. However, in a variable speed motor, the optimum phases (e.g. for optimum motor efficiency) of the commutator control signals will change with, for example, the speed and load of the motor. Therefore, in the preferred embodiment, where the position encoder described above is used in a variable speed motor, the amount of phase shift which is applied to the commutator control signals is continuously controlled in dependence upon the motor's operating conditions. Such an embodiment will now be described with reference to FIGS. 11 and 12. In this embodiment, in addition to using the output signals from the position encoder 11 to control the commutation of the drive current to the stator coils, the output signals from the position encoder will also be used to control the amount of drive current applied to the stator coils in order to control the speed and/or position of the rotor.

The excitation, resonator and receive windings in this embodiment are the same as those in the first embodiment. The signals from the position encoder are processed in a similar manner to the second embodiment in order to generate control signals for controlling the commutation of the drive current (provided by the power supply 209) to the stator coils. In this embodiment, the phase signal 127 output by the vector-to-phase converter 107 is also applied to a control unit 211 which extracts the current rotor position from the phase of this signal 127. The control unit 211 then outputs appropriate control signals 213 for controlling the stator coil switching and drive circuitry 215 in accordance with one or more desired set points 217 (such as a desired rotor speed or a desired rotor position). The control unit 211 can perform this control using simple proportional, integral and/or differential control techniques which do not require a microprocessor. However, in this embodiment, the control unit 211 is also arranged to control the phase of each of the commutation signals by sending appropriate control signals 219 to the digital waveform generator 101. To do this, the control unit 211 is arranged to monitor the efficiency of the motor over a period of time and this requires a microprocessor. Alternatively, the control unit 211 could use a look up table which relates, for example, the motor's speed and output torque to the necessary control signals 219 for generating the correct switching times.

Figure 12A:
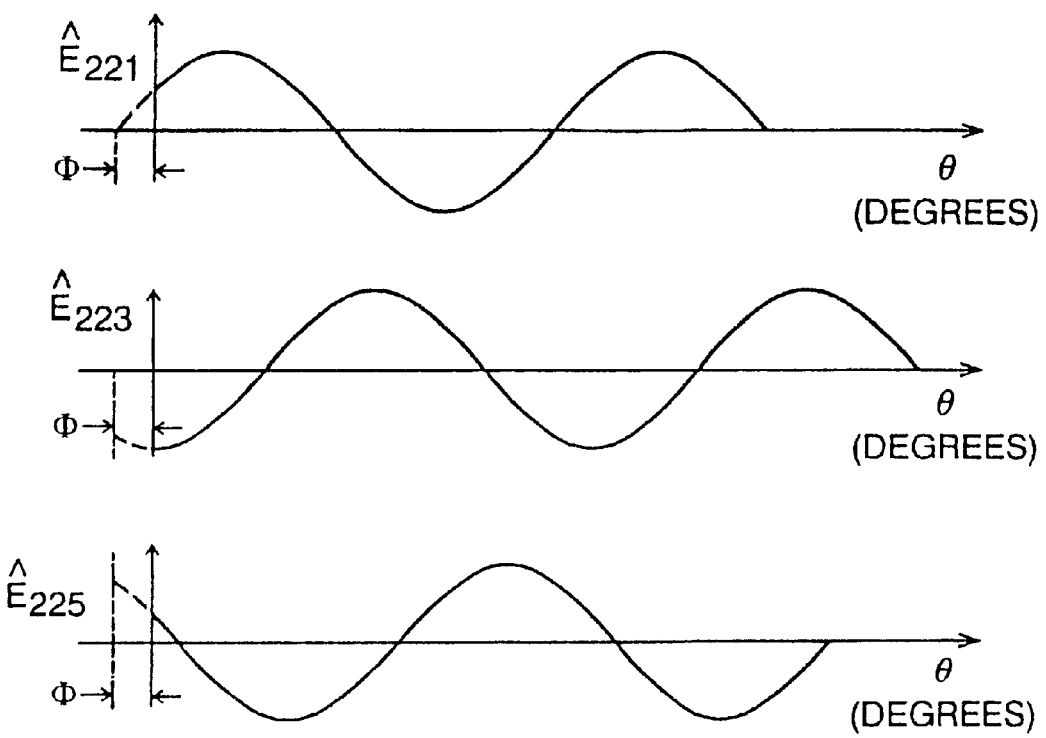
FIG. 12a illustrates the way in which the peak amplitude of the signal induced in each receive winding forming part of the position encoder shown in FIG. 11 varies with the angular position of the rotor of the motor.
Figure 12B:
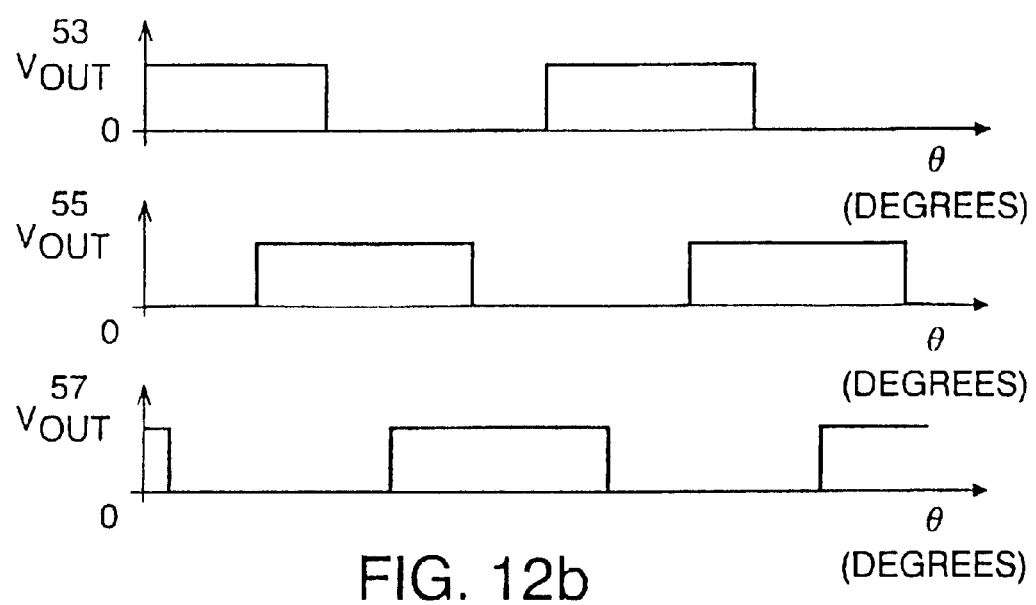
FIG. 12b illustrates the way in which the switching control signals used to control the switching of the drive current to the stator coils vary with the angular position of the rotor.

FIG. 12a shows the way in which the signals 221, 223 and 224 output by the phase-to-vector converter vary with the angular position (θ) of the shaft 3. By comparing the equivalent signals in FIG. 3a, it can be seen that the phase of each of the signals $\hat{E}_{221}$, $\hat{E}_{221}$ and $\hat{E}_{225}$ have been shifted by a phase shift of φ. Therefore, as shown in FIG. 12b, the corresponding commutator control signals output from the comparators 53, 55 and 57 are also shifted by this phase shift.

In the above embodiment, the same position encoder was used to provide signals to a controller which controlled the speed and/or position of the motor and the commutation of the drive current into the stator coils. This is possible because the position encoder described above is an absolute position encoder (as required for the commutation) and has sufficient accuracy for the motor speed and/or position control. In particular, the above position encoder can encode the angular position of the shaft to within 0.1° accuracy. Further, since it does not rely on iron-cored sense coils, it has a much faster response speed to changes in the motor speed, load etc and can be used in control loops requiring a group delay less than 10 μs. It also has the advantage that the winding which is mounted on the rotatable shaft is made of light weight printed circuit board and is therefore easier to balance on the shaft for use in high speeds of, for example, greater than 20,000 rpm.

It is also possible, with suitable processing of the signals from the receive windings to change the phase of each comparator output by a different amount in order to obtain optimum running efficiency of the motor. This might be necessary due to inaccuracies in the manufacture of the motor. For example, the north and south poles on the rotor might not be evenly spaced around the rotor. Other manufacturing defects can also occur which will change the theoretical optimal switching angles for the motor. In this case, it is advantageous to be able to change the phase of each control signal used to control the switching of the drive current to the respective stator coils. This changing of the phase of each control signal can be performed in the factory in the manner described above with reference to FIG. 6 or, alternatively, it can be performed continuously by incorporating these variables into the feedback control loop described with reference to FIG. 11. FIG. 13a and 13b illustrates the way in which the signals output from the phase to vector converter and output from the corresponding comparators might vary with the angular position (θ) of the shaft in such an embodiment.

In the above embodiments, a single N-S pole pair rotor was used. The above embodiment can be easily adapted to operate for a multi-pole rotor by simply increasing the periodicity of the receive windings on the circuit board 13. For example, if the rotor has three N-S pole pairs, then a receive winding having three periods would have to be used. In such an embodiment, the output signal from each receive winding would vary sinusoidally with the angular position of the shaft, with the sinusoidal variation repeating every third of a revolution of the shaft. A set of receive windings, a resonator and an excitation winding which can be used to achieve this are described in the Applicant's earlier International Application WO98/00921 and will not be described again here.

In the above embodiments, the signals from the position encoder have been used to control the switching of the drive current to the stator coils. For demonstration purposes or for low power situations where drive efficiency is not important, the signals from the position encoder can be amplified using linear amplifiers and used directly to drive the motor coils.

In the above embodiments, separate mixers, filters, adders and comparators have been illustrated. This circuitry could be implemented using a digital ASIC (Application Specific Integrated Circuit) since each of these functions can be performed in such a chip in an "analogue" manner (i.e. without the use, cost or processing speed limitations of a microprocessor). Such an ASIC design would reduce the overall cost and complexity of the design. For further cost savings and a compact design, the drive electronics could share the same circuit board as the receive coils.

In the above embodiments, a DC supply was used. Alternatively an unrectified single phase AC supply could be used together with changeover switches. The changeover switches can be gate-turn-off triacs or multiple thyristors (where thyristors are used to turn off other thyristors). Alternatively, the incoming AC supply could be bridge-rectified, thus allowing the use of single polarity switching devices. For a motor running from a three phase AC supply, a matrix of switches would be used through which each end of each stator winding can be connected to any phase of the supply. Many types of switch elements can be used to implement this design, such as IGBTs, FETs, thyristors or triacs, depending on the application and existing switching techniques and circuits can be used with the basic analogue control system.

In addition to being able to control the speed and/or position of the rotor, the control unit can be used to control the torque output of the rotor. However, to do so, the control unit will need a measure of the current applied to the stator coils or a direct measurement of torque.

Although the emphasis of the embodiments described above has been to provide a commutation control system for a motor which does not require a microprocessor, the system could be used in a more conventional microprocessor-based design. This would be appropriate if the requirements for a feedback or control loop were too complex to be implemented in analogue circuitry. In these circumstances, it is no longer necessary for the phases and periodicity of the receive windings and of the motor to match, although it makes the design easier if they do. In such a system, the position encoder 11 would provide continuous rotary position feedback and code in the microprocessor would be used to determine the switching points for the power switch elements based on this position. Such a system would still out-perform the Hall effect system because the position feedback is continuous and switching times do not need to be interpolated. This system would also out-perform the resolver system since it can operate over a much larger range of operating speeds.

In the above embodiments, each of the excitation, resonator and receive windings were relatively immune to electromagnetic interference. This was because they each comprised a number of series connected alternate sense loops. In an alternative embodiment, the excitation and resonators might not have such immunity to electromagnetic interference. Whilst this is not preferred because it degrades the quality of the signals from the receive windings, such a system could still be used to control the motor in the manner described above.

In the above embodiment, a resonator was used to generate a magnetic field which varied as the resonator rotated. A similar magnetic field can be generated by other electromagnetic elements, such as from short circuit coils or metal screens. Such a short circuit coil embodiment could use the windings 31 and 33 described above with reference to FIG. 5. In such an embodiment, the coupling of magnetic flux between the transmit and receive windings is governed by the presence or absence of the short circuit coil or metal screen, and a careful design of the location of the coils and screens give rise to a similar set of sinusoidally varying output signals from the receive windings. Therefore, the same type of signal processing can then be applied to generate the commutator control signals for the stator coils. Such a position encoder would have the advantage that it is cheaper than the resonator design since the short circuit coils or metal screens can be made part of the rotor, e.g. as a stamped laminate, pressed steel, machined steel or cast steel. However, the resonator design is preferred because it provides much greater output signal levels and allows a pulse-echo mode of operation to be used (where a burst of excitation signal is applied to the energising winding and the signals on the receive windings are only processed after the burst has ended—this is possible because the resonator continues to "ring" after the excitation signal has been removed).

In the above embodiments, an excitation signal is applied to the excitation winding 21 and the signals induced in the receive windings 25, 27 and 29 were used to determine the position of the shaft 3. In an alternative embodiment, the excitation signal could be applied to each of the receive windings 25, 27 and 29 in turn, in order to energise the resonator and the signal induced in the excitation circuit 21 by the resonator would then carry the position information.

In the above embodiments, a permanent magnet type rotor was employed. Other types of rotor may be used, such as iron laminate rotors like those used in switched reluctance motors.

In the above embodiment, a passive device was mounted for rotation with the shaft of the motor. In an alternative embodiment, a powered coil could be used, in which case there is no need for an energising winding to be mounted on the circuit board 13. However, such an embodiment is not preferred, since it requires the use of a battery or another power source.

In the above embodiments, the circuit board 13 rotated in synchronism with the rotation of the rotor. In some embodiments, the circuit board 15 carrying the resonator might be attached to a shaft which is connected to the rotor through a set of gears. In this case, if the signals output from the receive windings are to be used to control directly the commutation of the stator coils, then the periodicity of the receive windings will have to take into consideration the gearing ratio.

In the above embodiments, the commutation of a rotary motor has been described. The present invention can be adapted so that the output of the position sensor is used to control the commutation of a linear motor. In such an embodiment, the stator coils might be arranged along a linear path, with switching of the drive current being applied to these stator coils in order to control the linear movement of for example a permanent magnet. In this case, a linear position sensor such as those described in the applicant's earlier application WO95/31696 may be used to control this commutation.

In the above embodiments, a set of stator coils have been mounted on a stator which have been used to energise a rotor. The way in which the commutation is performed in the above embodiments can also be used in a motor having coils on the rotor and having a permanent magnet type stator or with motors having coils on both the stator and the rotor. However, in these embodiments, a slip ring will have to be provided in order to be able to connect each of the rotor coils to the switching circuitry.

The embodiments described above with reference to FIGS. 6, 9 and 11 have the advantage that the stator coil switching timing is electronically programmable either by a user or continuously within a control loop. The same advantage can be achieved using a different position encoder to encode the position of the rotor. For example, a resolver or an optical position encoder could be used to generate the signals which are input to the vector-to-phase converter. However, the position sensor described with reference to FIGS. 4 and 5 is preferred because of the advantages already described.

In the embodiments described with reference to FIGS. 6, 9 and 11, the vector to phase converter used a comparator to compare the signal output from the low pass filter. This is not essential. The sinusoidally varying phase signal output from the adder could be input into the phase to vector converter. However, use of such a comparator is preferred because it reconditions the signal.

What is claimed is:

1. A circuit for use in a position sensor comprising a plurality of series connected concentric loops arranged so that the winding direction of the outermost loop is opposite to the winding direction of other ones of said concentric loops.

2. A circuit according to claim 1, wherein the innermost winding is wound in the same direction as the outermost winding.

3. A circuit for use in a position sensor comprising:
   a first portion having at least one loop;
   a second portion connected in series with said first portion, said second portion comprising a plurality of loops connected in series and being arranged so that signals generated in adjacent loops by a common electromagnetic field oppose each other.

4. A circuit according to claim 3, wherein a capacitor is connected in series with the loops of said first and second portions.

5. A circuit for use in a position sensor comprising at least two loops connected in series and being arranged so that signals generated in said at least two loops by a common electromagnetic field oppose each other, and wherein said loops are arranged to cross each other to define a plurality of subloops, adjacent ones of which have opposite sensitivity to electromagnetic fields.

6. A circuit according to claim 5, wherein said loops are defined by a set of increasing and decreasing spiral windings.

7. A circuit for use in a position sensor comprising a plurality of concentric, series connected loops the winding direction and spacing of which are arranged so that a magnetic field generated by a current flowing in the loops is a maximum inside the annulus defined between the largest loop and the smallest loop and a minimum outside this annulus.

8. An electric motor comprising:

a stator and an element movable relative to said stator;

a plurality of energising coils;

a position sensor for sensing the position of said movable element, comprising a first member mountable with said movable element and a second member fixable relative to said stator;

at least one of said first and second members comprising a plurality of circuits each having at least two loops connected in series and being arranged so that signals generated in said at least two loops by a common electromagnetic field oppose each other; and the other one of said first and second members comprising a field generator for generating an electromagnetic field, which generator is adapted, in use, to be electromagnetically coupled to each of said circuits and wherein the electromagnetic coupling between the field generator and each circuit continuously varies as a function of their relative position, such that in response to an electromagnetic field generated by said field generator, a plurality of output signals are generated respectively dependent upon the electromagnetic coupling between the field generator and the respective said circuits;

means for processing said plurality of output signals to generate a plurality of control signals; and means for controlling the application of a supply current to said energising coils in accordance with said control signals for causing said movable element to move relative to said stator.

9. A motor according to claim 8, wherein said output signals from said position sensor are used to control both the commutation of the supply current to said energising coils and to control the level of supply current supplied to said energising coils to control the position and/or the speed of the motor.

10. A position sensor comprising:

first and second members which are adapted, in use, to be movable relative to each other;

said first member comprising a first circuit having at least two loops connected in series and being arranged so that signals generated in said at least two loops by a common electromagnetic field oppose each other, and a second circuit;

said second member comprising a field generator having a first portion which is adapted, in use, to have a substantially constant electromagnetic coupling with said second circuit and a second portion having at least two loops connected in series and being arranged so that signals generated in said at least two loops by a common electromagnetic field oppose each other;

wherein the loops of said second portion are adapted, in use, to be electromagnetically coupled to the loops of said first circuit, which coupling continuously varies as a function of the relative position of said first and second members, such that in response to an input driving signal applied to one of said first and second circuits, said field generator generates an electromagnetic field which generates an output signal in the other one of said first and second circuits, which output signal continuously varies as a function of the relative position of said first and second members.

11. A method of controlling a motor having a stator and an element movable relative to the stator and a plurality of energising coils, the method comprising the steps of:

providing a position sensor for sensing the position of the movable relative to the stator, the position sensor comprising a first member mountable with said movable element and a second member fixable relative to said stator;

at least one of the first and second members comprising a plurality of circuits each having at least two loops connected in series and being arranged so that signals generated in said at least two loops by common electromagnetic field oppose each other; and the other one of said first and second members comprising a field generator for generating an electromagnetic field, which generator is adapted, in use, to be electromagnetically coupled to each of said circuits and wherein the electromagnetic coupling between the field generator and each circuit continuously varies as a function of their relative position, such that in response to an electromagnetic field generated by said field generator, a plurality of output signals are generated respectively dependent upon the electromagnetic coupling between the field generator and the respective said circuits;

causing said field generator to generate said electromagnetic field;

processing said plurality of output signals to generate a plurality of control signals; and controlling the application of a supply current to said energising coils in accordance with said control signals for causing said movable element to move relative to said stator.

12. An electric motor comprising:

a stator and an element movable relative to said stator;

a plurality of energising coils;

means for switching a supply current to a selected one or more of said energising coils for causing said movable element to move relative to said stator;

a position sensor for sensing the position of said movable element, comprising a first member mountable with said movable element and a second member fixable relative to said stator;

at least one of said first and second members comprising a plurality of circuits each having at least two loops connected in series and being arranged so that signals generated in said at least two loops by a common electromagnetic field oppose each other; and the other one of said first and second members comprising a field generator for generating an electromagnetic field, which generator is adapted, in use, to be electromagnetically coupled to each of said circuits and wherein the electromagnetic coupling between the field generator and each circuit continuously varies as a function of their relative position, such that in response to an electromagnetic field generated by said field generator, a plurality of output signals are generated respectively dependent upon the electromagnetic coupling between the field generator and the respective said circuits; and means for processing said plurality of output signals to generate a plurality of control signals for controlling said switching means.

13. A motor according to claim 12, wherein said energising coils are mounted on said stator.

14. A motor according to claim 12, wherein the number of output signals matches the number of energising coils.

15. A motor according to claim 12, wherein said movable elements comprises a number of north and south pole pairs.

16. A motor according to claim 15, wherein each of said plurality of circuits are periodic, and wherein the periodicity matches the number of north and south pole pairs on said movable element.

17. A motor according to claim 12, wherein said first member of said position sensor is mounted, in use, to said movable element via a set of gears.

18. A motor according to claim 12, wherein said movable element is a rotor and wherein said position sensor is a rotary position sensor.

19. A motor according to claim 12, wherein said field generator comprises at least one of: a resonator, a short circuit coil, a conductive screen or a powered coil.

20. A motor according to claim 12, wherein said field generator comprises at least two loops connected in series and being arranged so that signals generated in said at least two loops by a common electromagnetic field oppose each other.

21. A motor according to claim 20, wherein said member which carries said plurality of circuits further comprises a second circuit and wherein said field generator comprises a first portion which is adapted, in use, to have a substantially constant electromagnetic coupling with said second circuit.

22. A motor according to claim 21, wherein said field generator and said plurality of circuits are arranged such that in response to an input driving signal being applied to said second circuit, said field generator generates an electromagnetic field which, in turn, generates an output signal in each of said plurality of circuits, which output signals continuously vary as a function of the relative position of said stator and said movable element.

23. A motor according to claim 21, wherein in response to an input driving signal being applied to one or more of said plurality of circuits, said field generator generates an electromagnetic field which, in turn, generates a corresponding one or more output signals in said second circuit, which one or more output signals continuously vary as a function of the relative position of said stator and said movable element.

24. A motor according to 21, wherein said second circuit and said portion of said field generator each comprise a plurality of series-connected concentric loops arranged so that signals generated in said loops by a common electromagnetic field oppose each other.

25. A motor according to claim 12, wherein said plurality of circuits are electrically separate from each other and are located one on the other, and wherein the plurality of loops of the respective circuits are spatially separated from each other.

26. A motor according to claim 25, wherein said energising coils are spaced over the movement direction of said movable element and wherein the spatial separation of the loops of said plurality of circuits are arranged to correspond to the separation between said energising coils.

27. A motor according to claim 12, comprising drive means for causing said field generator to generate said magnetic field.

28. A motor according to claim 27, wherein said field generator is operable to receive a pulse of said driving signal from said drive means during a first time interval, and is operable to continue to generate said magnetic field during a second interval after said first interval, and wherein said processing means is arranged to process said signals to provide said control signals during said second time interval.

29. A motor according to claim 12, wherein said output signals are time-varying signals whose peak amplitude varies with the relative position between said stator and said movable element, and wherein said processing means comprises a demodulator for demodulating said output signals to provide a plurality of output signals whose values depend upon the current position of the movable element relative to said stator.

30. A motor according to claim 29, wherein said processing means further comprises a plurality of comparators for comparing the respective values of said demodulated output signals with a reference signal to generate said control signals.

31. A motor according to claim 12, wherein said plurality of circuits are carried on a substantially planar surface.

32. A motor according to claim 31, wherein said plurality of circuits are formed by conductors on a printed circuit board.

33. A motor according to claim 12, wherein each of said output signals varies periodically with said relative position and out of phase with respect to each other.

34. A motor according to claim 33, comprising means for combining said signals to generate a time varying signal whose phase varies with said relative position.

35. A motor according to claim 33, further comprising means for varying the phase of each of said signals so as to change the switching timing of said drive current to said energising coils.

36. A motor according to claim 35, wherein said shifting means applies the same shift to each of said output signals.

37. A motor according to claim 36, wherein said shift means varies the shift applied to said output signals in dependence upon the measured condition of said motor.

38. A motor according to claim 37, wherein said measured condition is at least one of the current speed of the motor, the output torque and/or a desired position and speed change of the motor.

39. A motor according to claim 34, further comprising means for multiplying said time varying signal with a plurality of further time varying signals to generate a plurality of output signals which periodically vary with said relative position and out of phase with respect to each other.

40. A motor according to claim 39, further comprising means for varying said further time varying signals so as to vary the phase of said control signals.

41. A motor according to claim 40, wherein said varying means is arranged to vary said further time varying signals so that a common phase shift is applied to said periodically varying signals.

42. A motor according to claim 40, wherein said varying means is operable to vary the phase of said further time varying signals.

43. A motor according to claim 41, wherein said common phase shift is set during manufacture of the motor.

44. A motor according to claim 40, further comprising control means for controlling said variation in dependence upon the operating conditions of said motor.

45. A motor according to claim 44, wherein said control means is operable to control said varying means in dependence upon at least one of: the current speed of the motor, the output torque and/or a desired position and speed of the motor.

46. A motor according to claim 45, wherein said control means is operable to receive said output signals from said position sensor and is further operable to control the amount of drive current applied to said energising coils to control the speed and/or position of said movable element relative to said stator.

47. A motor according to claim 44, further comprising means for determining the output torque of said motor, and wherein said control means is operable to control the drive current applied to said energising windings in dependence upon the sensed output torque so as to maintain a desired output torque.

\* \* \* \* \*